US011200328B2

(12) United States Patent
Shpurov et al.

(10) Patent No.: US 11,200,328 B2
(45) Date of Patent: Dec. 14, 2021

(54) HOMOMORPHIC ENCRYPTION OF COMMUNICATIONS INVOLVING VOICE-ENABLED DEVICES IN A DISTRIBUTED COMPUTING ENVIRONMENT

(71) Applicant: The Toronto-Dominion Bank, Toronto (CA)

(72) Inventors: Alexey Shpurov, Toronto (CA); Milos Dunjic, Oakville (CA); Brian Andrew Lam, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 249 days.

(21) Appl. No.: 16/655,453

(22) Filed: Oct. 17, 2019

(65) Prior Publication Data

US 2021/0117553 A1  Apr. 22, 2021

(51) Int. Cl.
*G06F 21/60* (2013.01)
*G10L 25/24* (2013.01)
(Continued)

(52) U.S. Cl.
CPC .......... *G06F 21/602* (2013.01); *G06N 20/00* (2019.01); *G10L 15/22* (2013.01); *G10L 25/24* (2013.01);
(Continued)

(58) Field of Classification Search
CPC combination set(s) only.
See application file for complete search history.

(56) References Cited

U.S. PATENT DOCUMENTS 7,313,528 B1  12/2007  Miller
7,493,259 B2   2/2009  Jones et al.
(Continued)

FOREIGN PATENT DOCUMENTS

CN  101510424  8/2009
CN  107086902  8/2017

OTHER PUBLICATIONS

S. Zhang, Y. Gong and D. Yu, "Encrypted Speech Recognition Using Deep Polynomial Networks," ICASSP 2019—2019 IEEE International Conference on Acoustics, Speech and Signal Processing (ICASSP), 2019, pp. 5691-5695, doi: 10.1109/ICASSP.2019.8683721.*

(Continued)

*Primary Examiner* — Harris C Wang
(74) *Attorney, Agent, or Firm* — Duane Morris LLP

(57) ABSTRACT

The disclosed exemplary embodiments include computer-implemented systems, devices, apparatuses, and processes that maintain data confidentiality in communications involving voice-enabled devices in a distributed computing environment using homomorphic encryption. By way of example, an apparatus may receive encrypted command data from a computing system, decrypt the encrypted command data using a homomorphic private key, and perform operations that associate the decrypted command data with a request for an element of data. Using a public cryptographic key associated with a device, the apparatus generate an encrypted response that includes the requested data element, and transmit the encrypted response to the device. The device may decrypt the encrypted response using a private cryptographic key and to perform operations that present first audio content representative of the requested data element through an acoustic interface.

20 Claims, 15 Drawing Sheets

(51) Int. Cl.
    *H04L 9/00*     (2006.01)
    *G06N 20/00*    (2019.01)
    *G10L 15/22*    (2006.01)

(52) U.S. Cl.
    CPC .............. *H04L 9/006* (2013.01); *H04L 9/008* (2013.01); *G10L 2015/223* (2013.01)

(56) References Cited

U.S. PATENT DOCUMENTS

| | | | |
|---|---|---|---|
| 8,306,817 | B2 | 6/2012 | Yu et al. |
| 8,433,892 | B2 | 4/2013 | Rane et al. |
| 8,667,062 | B2 | 4/2014 | Aad et al. |
| 9,271,111 | B2 | 2/2016 | Blanksteen |
| 9,294,277 | B2 | 3/2016 | Poston, Jr. et al. |
| 9,306,738 | B2 * | 4/2016 | Loftus ..................... H04L 9/008 |
| 9,628,450 | B2 | 4/2017 | Rohloff |
| 9,654,810 | B2 | 5/2017 | Altmann |
| 9,787,647 | B2 * | 10/2017 | Wu .......................... G06N 5/02 |
| 9,864,576 | B1 | 1/2018 | Liu et al. |
| 9,940,930 | B1 * | 4/2018 | Campbell ............... G06F 3/167 |
| 10,026,407 | B1 | 7/2018 | Boucheron et al. |
| 10,103,872 | B2 | 10/2018 | Pappachan et al. |
| 10,163,436 | B1 | 12/2018 | Slifka et al. |
| 10,170,116 | B1 | 1/2019 | Kelly et al. |
| 10,176,809 | B1 | 8/2019 | Pierard |
| 10,602,270 | B1 * | 3/2020 | Sorensen ................. G10L 25/48 |
| 2016/0225369 | A1 * | 8/2016 | Agrawal .............. G06F 3/04886 |
| 2018/0285576 | A1 | 10/2018 | Cannings et al. |
| 2018/0359229 | A1 | 12/2018 | Ding et al. |
| 2019/0147890 | A1 | 5/2019 | Page |
| 2019/0244608 | A1 * | 8/2019 | Choi ........................ G10L 15/08 |
| 2019/0295547 | A1 * | 9/2019 | Gandhi .................. H04W 12/06 |
| 2020/0374269 | A1 * | 11/2020 | Lidman ................... H04L 63/10 |
| 2020/0388276 | A1 * | 12/2020 | Kunnath ................. G10L 15/22 |
| 2021/0117553 | A1 * | 4/2021 | Shpurov ................. H04L 9/006 |

OTHER PUBLICATIONS

Hadian et al., "Efficient and privacy-preserving voice-based search over mHealth data," 2017 IEEE/ACM International Conference on Connected Health: Applications, Systems and Engineering Technologies (CHASE), Aug. 17, 2017 (14 pages).

Nautsch et al., "Homomorphic encryption for speaker recognition: protection of biometric templates and vendor model parameters," Odyssey 2018 The Speaker and Language Recognition Workshop, Jun. 2018 (8 pages).

* cited by examiner

HOMOMORPHIC ENCRYPTION OF COMMUNICATIONS INVOLVING VOICE-ENABLED DEVICES IN A DISTRIBUTED COMPUTING ENVIRONMENT

TECHNICAL FIELD

The disclosed embodiments generally relate to computer-implemented systems and processes that maintain data confidentiality in communications involving voice-enabled devices in a distributed computing environment using homomorphic encryption.

BACKGROUND

Many voice-enabled devices, such as smart phones, tablet computers, or wireless smart speakers, support and facilitate voice-based interaction with programmatically generated virtual assistants. These voice-enabled devices, and the corresponding virtual assistants, may rely on providers of cloud-based services to process audio content and to transmit commands consistent with the processed audio content to one or more third-party computing systems, which perform operations consistent with a determined intent of the audio processed content, e.g., to retrieve requested data and route the requested data back to the voice-enabled devices via the providers of the cloud-based services. In some instances, the voice-enabled devices, providers of cloud-based services, and third-party computing systems exchange data across one or more publicly available communications networks in the "clear" and without encryption. Further, as many of the processes applied to the received audio content by the providers of cloud-based services include machine-learning-based or artificial-intelligence-based processes, the providers of these cloud-based services often record all data exchanged between the voice-enabled devices and the third-party computing systems to train and adaptively improve the applied processes.

SUMMARY

In some examples, an apparatus includes a communications interface, a memory storing instructions, and at least one processor coupled to the communications interface and the memory. The at least one processor is configured to execute the instructions to receive, via the communications interface, encrypted command data from a computing system, decrypt the encrypted command data using a homomorphic private key, and perform operations that associate the decrypted command data with a request for an element of data. The at least one processor is also configured to obtain the requested data element, and using a public cryptographic key associated with a device, generate an encrypted response that includes the requested data element. Further, the at least one processor is configured to transmit the encrypted response to the device via the communications interface. The device is configured to decrypt the encrypted response using a private cryptographic key and to perform operations that present first audio content representative of the requested data element through an acoustic interface.

In other examples, a computer-implemented method includes receiving, using at least one processor, encrypted command data from a computing system, and using the at least one processor, decrypting the encrypted command data using a homomorphic private key associated with a device, and performing operations that associate the decrypted command data with a request for an element of data. The computer-implemented method also includes, using the at least one processor, obtaining the requested data element, and generating an encrypted response that includes the requested data element using a public cryptographic key associated with the device. Further, the computer-implemented method transmits the encrypted response to the device using the at least one processor. The device is configured to decrypt the encrypted response using a private cryptographic key and to perform operations that present audio content representative of the requested data element through an acoustic interface.

Additionally, and in some examples, a device includes a communications interface, a memory storing instructions, and at least one processor coupled to the communications interface and the memory. The at least one processor is configured to execute the instructions to, using a homomorphic public key, generate encrypted coefficient data representative of a power spectrum of first audio content. The first audio content identifies a request for an element of data maintained at a first computing system. The at least one processor is also configured to transmit the encrypted coefficient data to a second computing system via the communications interface. The second computing system is configured to generate encrypted command data based on the encrypted coefficient data and transmit the encrypted command data to the first computing system. Further, the at least one processor is configured to receive, via the communications interface, an encrypted response from the first computing system that includes the requested data element, decrypt the encrypted response using a private cryptographic key, and based on the decrypted response, perform operations that present second audio content representative of the requested data element through an acoustic interface.

The details of one or more exemplary embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
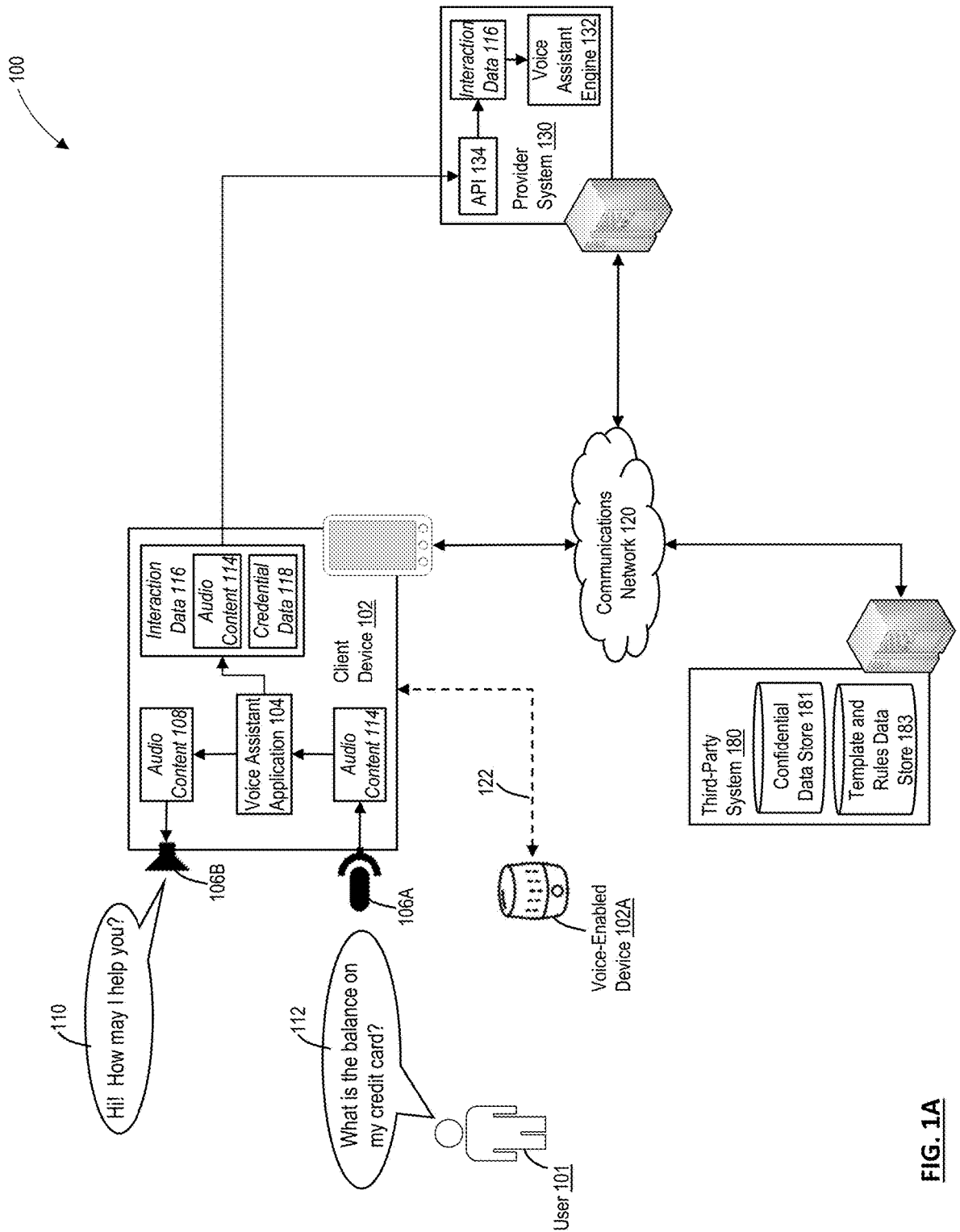
FIGS. 1A-1B, 2, 3A-3C, and 4A-4C are block diagrams illustrating portions of an exemplary computing environment, in accordance with some exemplary embodiments.

FIGS. 1A-1B, 2, and 3A-3C illustrate components of an exemplary computing environment 100, which perform computerized processes that, upon implementation by an application program executed at a voice-enabled device and a third-party computing system, bypass fully, or partially, a computing system associated with a provider of the cloud-based services when generating and encrypting elements of confidential data that respond to an inquiry associated with audio content captured by the voice-enabled device. For example, referring to FIG. 1A, environment 100 may include one or more voice-enabled devices, such as client device 102, one or more computing systems associated with a provider of cloud-services, such as a provider system 130, and one or more third-party computing systems, such as third-party system 180, each of which may be interconnected through one or more communications networks, such as communications network 120. Examples of communications network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some instances, client device 102 may include one or more tangible, non-transitory memories that store data and/or software instructions and one or more processors configured to execute the software instructions. The stored software instructions may, for example, include one or more application programs, one or more application modules, or other elements of code executable by the one or more processors. For instance, and as illustrated in FIG. 1A, client device 102 may store, within the one or more tangible, non-transitory memories, a voice assistant application 104 that, when executed by the one or more processors, causes client device 102 to interact programmatically with user 101 based one or more spoken utterances captured by a microphone, voice-activated input device, or appropriate acoustic input devices coupled to the one or more processors (e.g., based on a voice-based "virtual assistant" established and maintained programmatically by client device 102), and based on acoustic data presented to user 101 through an acoustic interface, such as, but not limited to, a speaker. For example, as illustrated in FIG. 1, client device 102 may include an embedded microphone 106A and an embedded speaker 106B, and examples of voice assistant application 104 include, but are not limited to, Amazon Alexa™, Google Assistant™, Bixby™, or Apple Siri™.

Client device 102 may also include a communications unit, such as one or more wireless transceivers, coupled to the one or more processors for accommodating wired or wireless internet communication with the one or more computing systems of the cloud-service provider (including provider system 130) and the one or more third-party systems (including third-party system 180). Further, client device 102 may also include a display unit coupled to the one or more processors and configured to present interface elements to user 101, and one or more additional input units coupled to the one or more processors and configured to receive input from user 101. By way of example, the display unit may include, but is not limited to, an LCD display, a TFT display, and OLED display, or other appropriate type of display unit, and one or more input units may include, but are not limited to, a keypad, keyboard, touchscreen, fingerprint scanner, stylus, or any other appropriate type of input unit. Further, in some examples, the functionalities of the display and input units may be combined into a single device, such as a pressure-sensitive touchscreen display unit that can present interface elements and can detect an input from user 101 via a physical touch.

As described herein, client device 102 may be associated with or operated by a user, such as user 101, and examples of client device 102 include, but are not limited to, as a smart phone, tablet computer, a desktop computer, a gaming console, a wearable device, a wireless smart speaker, a network-connected, Internet-of-Things (IoT) device, or any additional, or alternate, voice-enabled device, system, or apparatus that facilitates voice-based interaction between user 101 and executed voice assistant application 104. In some instances, client device 102 may also establish communications with one or more additional voice-enabled devices operating within environment 100 across a wired or wireless communications channel, e.g., via the communications interface using any appropriate communications protocol.

By way of example, as illustrated in FIG. 1A, client device 102 may establish a direct, wireless communications channel 122 with an additional voice-enabled device 102A operating within environment 100, such as, but not limited to, a wireless smart speaker or an IoT device. As described herein, voice-enabled device 102A may include one or more tangible, non-transitory memories that store data and/or software instructions, one or more processors configured to execute the software instructions, and a corresponding communications interface coupled to the one or more processors. In some instances, client device 102 and voice-enabled device 102A may exchange data across wireless communications channel 122 in accordance with a Bluetooth™ communications protocol, a near-field communications (NFC) protocol, an optical wireless communications (OWC) protocol, or any additional or alternate communications protocol appropriate to, and compatible with, the communications interfaces of client device 102 and voice-enabled device 102A. For example, and upon execution of the software instructions by the one or more processors, voice-enabled device 102A may perform operations that include, but are not limited to, capturing an utterance spoken by user 101 (e.g., using a microphone) and transmitting audio input data representative of the spoken utterance to client device 102 across wireless communications channel 122, or receiving synthesized audio content from client device 102 across wireless communications channel 122 and presenting that synthesized audio content to user 101, e.g., via a corresponding speaker or other appropriate acoustic interface.

As described herein, each of the computing systems associated with the cloud-services provider (including provider system 130) and the third-party computing systems (including third-party system 180) may represent a computing system that includes one or more servers and tangible, non-transitory memory devices storing executable code and application modules. Further, the one or more servers may each include one or more processors, which may be configured to execute portions of the stored code or application modules to perform operations consistent with the disclosed embodiments. In some instances, provider system 130 or third-party system 180 may be incorporated into a single computing system, although in other instances, provider system 130 or third-party system 180 can correspond to a distributed system that includes computing components distributed across one or more communications networks, such as network 120 or one or more additional communications networks provided or maintained by the cloud-services provider.

As described herein, provider system 130 may be associated with operated by a cloud-services provider (e.g., Amazon Web Services™, Google Cloud™, Microsoft Azure™, etc.). In some instances, provider system 130 may provision voice assistant application 104 to client device 102 (and to other voice-enabled devices operating within environment 100) and further, may perform operations that support the execution of voice assistant application 104 by client device 102. For example, as illustrated in FIG. 1A, provider system 130 may maintain a voice assistant engine 132 within the one or more tangible, non-transitory memories. Upon execution by the one or more processors of provider system 130, voice assistant engine 132 may receive audio content captured by client device 102 through a corresponding programmatic interface, such as application programmatic interface (API) 134, and may perform any of the exemplary processes described herein to process the received audio content, determine a content, meaning, or intent of the processed audio content, and to generate and route requests or commands consistent with the determined content, intent, or meaning to one or more third-party computing systems operating within environment 100, such as third-party system 180.

In some instances, one or more of the third-party computing systems, such as third-party system 180, may be associated with, or operated by, a financial institution or other business entity that provides financial services to one or more customers, such as user 101. For example, and to facilitate the provisioning of the financial services to the one or more customer, third-party system 180 may maintain, within the one or more tangible, non-transitory memories, elements of sensitive, profile, account, or transaction data on behalf of each of the one or more customers, including user 101 (e.g., as structured or unstructured data records of confidential data store 181). The disclosed embodiments are, however, not limited to third-party computing systems operated by financial institutions, and in other examples, one or more of the third-party computing systems may be operated, or associated with, any additional or alternate third-party entity unrelated to the provider of the cloud-based services, such as, but not limited to, a healthcare organization, a judicial entity, or a governmental entity, and each of these third-party computing system may maintain additional or alternate elements of sensitive and confidential data.

By way of example, a user of a voice-enabled device, such as user 101, may contemplate a purchase transaction involving a credit card account issued by a financial institution (e.g., the financial institution associated with third-party system 180), and may elect to determine a current balance of that credit card account prior to initiating the purchase transaction. In one instance, not illustrated in FIG. 1A, user 101 may provide input to client device 102, e.g., via the input unit, that requests an execution of a mobile banking application associated with the financial institution, and upon execution, the mobile banking application may perform operations that generate and render one or more interface elements for presentation on a corresponding digital interface, e.g., via the display unit. Based on further input, provided via the input unit, that specifies one or more authentication credentials (e.g., an alphanumeric login credential, an alphanumeric password, or a biometric credential, such as a fingerprint scan or a facial image, etc.), the executed mobile banking application may authenticate the identity of user 101 and generate further interface elements that, when rendered for presentation within the digital interface, provide the current balance of the credit card account held by user 101.

In other instances, however, user 101 may be incapable of providing the input, to client device 102 via the input unit, that requests the execution of the mobile banking application by client device 102, or that specifies the authentication credentials facilitating the authentication of user 101's identity by the executed mobile banking application. For example, user 101 may be participating in an activity that limits an interaction between user 101 and the input unit of client device 102, e.g., a miniaturized virtual keyboard presented on a pressure-sensitive, touchscreen display. In other examples, client device 102 may correspond to a voice-enabled device (e.g., a smart watch, a wearable device, or a wireless smart speaker, etc.) having a display unit or an input unit characterized by a limited functionality or size, which further limits an ability of user 101 to request the current balance of the credit card account through the provisioned input described herein.

In some exemplary embodiments, and responsive to the limited ability or willingness to interact with the mobile banking application through the input unit of client device 102, user 101 may request the current balance of the credit card account using the voice-based "virtual assistant" established and maintained programmatically by executed voice assistant application 104. For example, and to access the voice-based virtual assistant established and maintained by executed voice assistant application 104, user 101 may utter a predetermined triggering word or phrase, which may be captured by a microphone or other voice-activated input device of client device 102 (e.g., microphone 106A of FIG. 1A). In some instances, microphone 106A may route audio content representative of the captured utterance to executed voice assistant application 104, which may process the audio content and determine whether the captured utterance corresponds to the predetermined triggering word or phrase.

Referring back to FIG. 1A, and based on a determination that the captured utterance corresponds to the predetermined triggering word or phrase, executed voice assistant application 104 may perform operations that generate or obtain one or more of elements of introductory audio content 108, and that route the elements of introductory audio content 108 to speaker 106B, e.g., for presentation to user 101. The elements of introductory audio content 108 may, for example, include synthesized speech that, when presented to user 101 by speaker 106, conveys audibly an introductory message 110 (e.g., "Hi! How may I help you?") that initiates a simulated conversation between user 101 and the virtual assistant generated programmatically by executed voice assistant application 104.

Responsive to the presentation of introductory message 110, microphone 106A of client device 102 may capture an additional utterance 112 of user 101 that requests the current balance of the credit card account held by user 101 (e.g., "What is the balance on my credit card"). As illustrated in FIG. 1A, microphone 106A may route audio content 114 representative of captured utterance 112 to executed voice assistant application 104, which may package audio content 114 into a corresponding portion of interaction data 116. Further, in some instances, executed voice assistant application 104 may also package, into a portion of interaction data 116, one or more elements of credential data 118 that uniquely identify user 101, client device 102, or executed voice assistant application 104. Examples of credential data 118 may include, but are not limited to, an authentication credential of user 101, a network address associated with client device 102 (e.g., an Internet Protocol (IP) address or a media access control (MAC) address), or an application-specific cryptogram, hash value, random number, or other element of cryptographic data that uniquely identifies executed voice assistant application 104. In other examples, credential data 118 may also include a digital token indicative of a successful outcome of a token-based authentication and consent protocol implemented between executed voice assistant application 104 and provider system 130 (e.g., an OAuth token indicative of the successful outcome of an OAuth protocol).

Further, executed voice assistant application 104 may perform operations that cause client device 102 to transmit interaction data 116 across network 120 to one of more of the computing systems associated with the cloud-services provider, such as provider system 130. As illustrated in FIG. 1A, a programmatic interface established and maintained by provider system 130, such API 134, may receive and route interaction data 116 to voice assistant engine 132 of provider system 130. Upon execution by the one or more processors of provider system 130, voice assistant engine 132 may perform any of the exemplary processes described herein to compute spectrum data representative of a power spectrum of audio content 114, and based on an application of one or more adaptive natural language processing (NLP) techniques to the portions of the spectrum data, convert captured utterance 112 into textual content and determine a meaning or an intent of the textual content and as such, of captured utterance 112 (e.g., a request for the current balance of user 101's credit card account). Based on the determined meaning or intent, executed voice assistant engine 132 may perform additional ones of the exemplary processes described herein to identify one of the third-party computing systems configured to perform operations consistent with the determined meaning or intent (e.g., third-party system 180, which maintains data characterizing the balance of user 101's credit card account), to generate data requesting the performance of the consistent operations (e.g., the retrieval of the requested balance of the credit card account), and to transmit the data across network 120 to the identified third-party computing system.

Figure 1B:
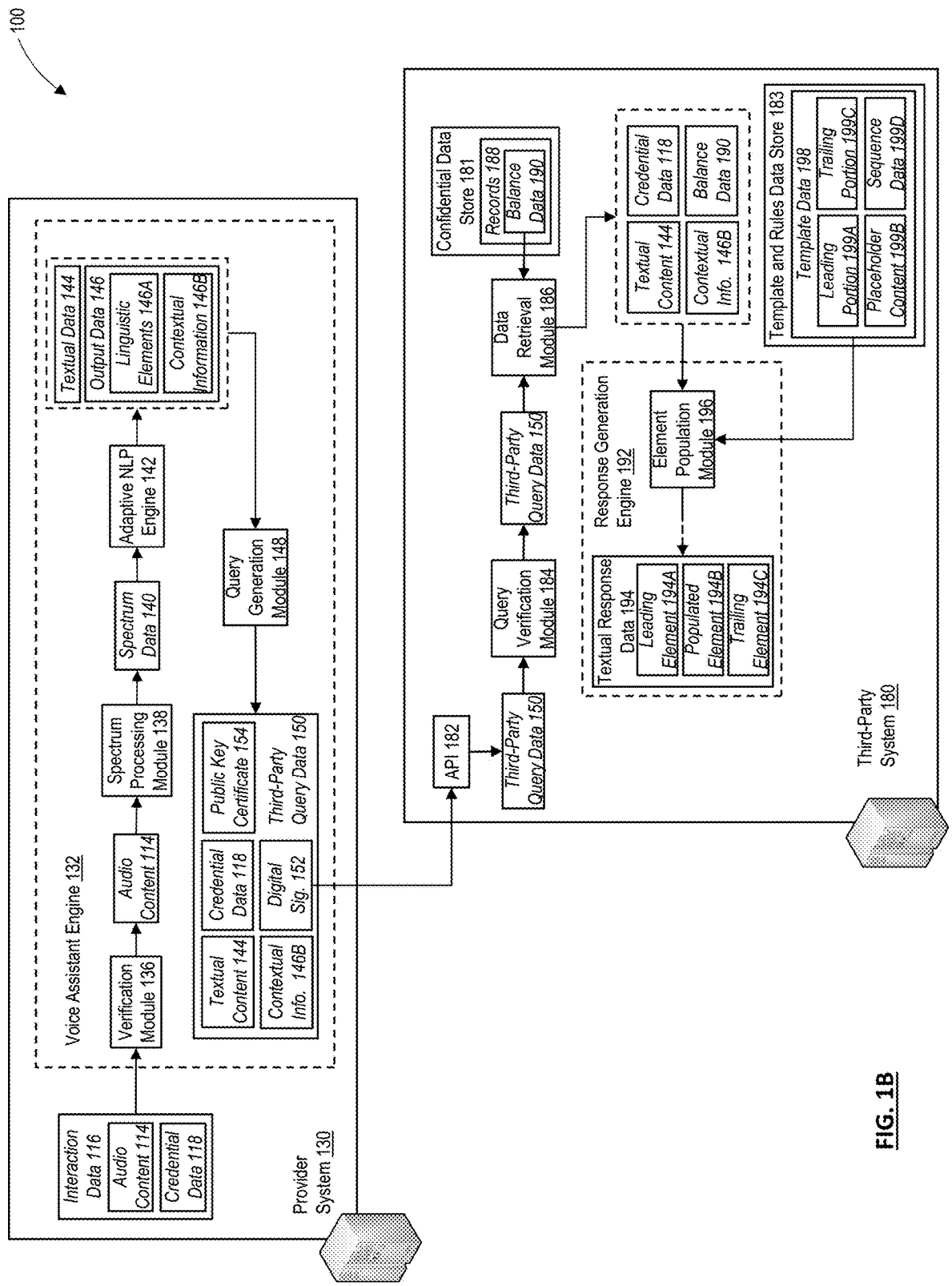

Referring to FIG. 1B, a verification module 136 of executed voice assistant engine 132 may receive interaction data 116, which includes audio content 114 and credential data 118, and may perform operations that verify interaction data 116 based on credential data 118. For example, credential data 118 may include an application-specific cryptogram associated with executed voice assistant application 104, and verification module 136 may verify interaction data 116 based on a determination that voice assistant application 104 represents a valid application program provisioned to client device 102 by provider system 130 (e.g., based on a determination that a structure or format of the application-specific cryptogram corresponds to an expected cryptogram structure or format). Further, and as described herein, credential data 118 may also include the authentication credential of user 101 or the network address associated with client device 102 (e.g., the IP or MAC address), and in additional or alternate examples, verification module 136 may verify interaction data 116 based on a determination that user 101 represents a registered user (e.g., based on a correspondence between the authentication credential of user 101 and a locally maintained reference credential) and/or a determination that client device 102 represents a device associated with a registered user (e.g., based on a correspondence between the network address of client device 102 and a locally maintained reference network address).

If, for example, verification module 136 were unable to verify interaction data 116, executed voice assistant engine 132 may discard interaction data 116, and may generate an error message indicative of the failed verification of interaction data 116 (not illustrated in FIG. 1B). Provider system 130 may transmit the generated error message across network 120 to client device 102, and executed voice assistant application 104 may perform operations that generate an audible representation of the generated error message for presentation to user 101, e.g., via speaker 106B (also not illustrated in FIG. 1B).

In other examples, if verification module 136 were to verify interaction data 116, verification module 136 may perform operations that store interaction data 116 within the one or more tangible, non-transitory memories of provider system 130. Further, verification module 136 may parse interaction data 116 to extract audio content 114, which verification module 136 may route to a spectrum processing module 138 of executed voice assistant engine 132. Spectrum processing module 138 may, for example, receive audio content 114, and process audio content 114 to generate spectrum data 140 representative of a short-term power spectrum of captured utterance 112. In some instances, the representation of the short-term power spectrum of captured utterance 112 may correspond to a mel-frequency cepstrum (MFC) of captured utterance 112, and spectrum data 140 may include mel-frequency cepstrum coefficients (MFCCs) that collectively establish the mel-frequency cepstrum (MFC).

For instance, and to derive the MFCCs for captured utterance 112, spectrum processing module 138 may perform operations that include, but are not limited to, computing a Fourier transaction of all, or a windowed excerpt, of audio content 114, and mapping powers of a spectrum obtained through the application of the Fourier transform to audio content 114 to a mel scale. Spectrum processing module 138 may also perform operations that calculate logarithmic values based on the powers of the obtained spectrum at each frequency on the mel scale, and that apply a discrete cosine transformation to the calculated logarithmic values. In some instances, the MFCCs may correspond to amplitudes of a spectrum resulting from the application of the discrete cosine transformation to the calculated logarithmic values, and spectrum processing module 138 may package each of the MFCCs into a corresponding portion of spectrum data 140. The disclosed embodiments are, however, not limited to the exemplary mel-frequency cepstrum and mel-frequency cepstrum coefficients described herein, and in other instances, spectrum processing module 138 may perform operations that derive, and package into spectrum data 140, coefficients of any additional or alternate representation of an appropriate power spectrum of captured utterance 112.

As illustrated in FIG. 1B, spectrum processing module 138 may provide spectrum data 140 as an input to an adaptive natural language processing (NLP) engine 142 of executed voice assistant engine 132. In some instances, adaptive NLP engine 142 may perform operations apply one or more natural language processing (NLP) processes or algorithms to all or a selected portion of spectrum data 140 (e.g., to the MFCCs and additionally, or alternatively, to other information characterizing the MFC of captured utterance 112 within spectrum data 140). Based on the application of these one or more NLP processes or algorithms to the portions of spectrum data 140, adaptive NLP engine 142 may convert captured utterance 112 into elements of textual data 144 representative of the request by user 101 for the credit-card balance (e.g., plain text that includes "what is the balance on my credit card").

Further, in some instances, executed adaptive NLP engine 142 may apply one or more additional, or alternate, NLP processes or algorithms to all or a portion of textual data 144. Based on the application of these additional or alternate NLP processes or algorithms, adaptive NLP engine 142 may identify one or more discrete linguistic elements (e.g., a word, a combination of morphemes, a single morpheme, etc.) within textual data 144, and may establish a meaning or intent of combinations of the discrete linguistic elements, e.g., based on the identified discrete linguistic elements, relationships between these discrete linguistic elements, and relative positions of these discrete linguistic elements within textual data 144. In some instances, adaptive NLP engine 142 may generate output data 146 that include linguistic elements 146A and contextual information 146B.

As described herein, linguistic elements 146A may include each of the discrete linguistic elements within textual data 144, and contextual information 146B may specify the established meaning or intent of the combination of the discrete linguistic elements. By way of example, captured utterance 112 may correspond to a request, by user 101, for the current balance of the credit card, and based on the application of the additional or alternate NLP processes or algorithms to textual data 144, adaptive NLP engine 142 may generate contextual information 146B that identifies and characterizes the request specified within captured utterance 112 (e.g., a balance inquiry involving the credit card account), and further, the financial institution associated with the balance inquiry. The disclosed embodiments are, however, not limited to these examples of contextual information, and in other instances, executed adaptive NLP engine 142 may generate and additional or alternate element of contextual information 146B that would be appropriate to captured utterance 112, textual data 144, or the additional or alternate NLP processes or algorithms.

Examples of these NLP processes or algorithms may include one or more machine learning processes, such as, but not limited to, a clustering algorithm or unsupervised learning algorithm (e.g., a k-means algorithm, a mixture model, a hierarchical clustering algorithm, etc.), a semi-supervised learning algorithm, or a decision-tree algorithm. In other examples, the NLP processes or algorithms may also include one or more artificial intelligence models, such as, but not limited to, an artificial neural network model, a recurrent neural network model, a Bayesian network model, or a Markov model. Further, the NLP processes or algorithms may also include one or more statistical processes, such as those that make probabilistic decisions based on attaching real-valued weights to elements of certain input data.

In some instances, each of the NLP processes or algorithms may be adaptively trained against, and improved using, selected elements of unencrypted training data, which may be locally maintained by provider system 130 (and others of the computing systems associated with the provider of the cloud-based services) within one or more tangible, non-transitory memories. By way of example, the elements of the training data may include, but are not limited to: (i) elements prior interaction data characterizing prior interactions between the programmatically generated virtual assistants described herein and users of voice-enabled devices within environment 100; and (ii) elements of prior outcome data identifying and characterizing an outcome associated with each of these prior interactions, such as an underlying query associated with each of these prior interactions, one of the third-party computing systems associated with the underlying query, or one or more serviced provided by, or operations performed by, the corresponding third-party computing system responsive to the underlying query. Provider system 130 may obtain the elements of training data from one or more of the voice-enabled devices operating within environment 100 (e.g., based on data exchanged programmatically with corresponding ones of the executed voice assistant application) and additionally, or alternatively, from one or more of the third-party computing systems operating within environment 100 (e.g., through a performance of operations that route responses to the underlying queries back to corresponding ones of the voice-enabled devices).

By way of example, a corresponding one of the NLP processes or algorithms described herein may be deemed trained when a quality or an accuracy of generated textual content satisfies a predetermined metric (e.g., the accuracy of the generated textual context exceeds a threshold accuracy, etc.), or when a quality or accuracy of the generated contextual information satisfies an additional, or alternate, predetermined metric (e.g., that a threshold amount of the information characterizing an underlying request, a product or service associated with that underlying request, or a third-party computing system associated with that underlying request is consistent with corresponding elements of the outcome data). In further instances, and as described herein, all or a portion of the elements of training data may include encrypted elements of prior interaction data and prior outcome data (e.g., encrypted using a homomorphic encryption key generated by one or more of the third-party systems, such as third-party system 180, and transmitted to each of the voice-enabled devices operating within environment 100, such as client device 102 or voice-enabled device 102A), and one or more of the NLP processes or algorithms described herein may be adaptively trained and improved using the encrypted elements of training data and as such, may process and operate upon encrypted elements of input data.

By way of example, and as described herein, textual data 144 may be representative of captured utterance 112, e.g., "What is the balance on my credit card?". Based on the application of certain of the exemplary NLP processes or algorithms described herein to textual data 144, adaptive NLP engine 142 may identify discrete linguistic elements (e.g., discrete words, etc.) that include, but are not limited to, "what," "is," "the," "balance," "on," "my," and "credit card," each of which may be packaged into a corresponding portion of linguistic elements 146A. Adaptive NLP engine 142 may perform further operations that package all or a portion of the discrete linguistic elements into corresponding portions of structured input data (e.g., individually or in ordered combinations), and based on an application of additional or alternate ones of the NLP processes or algorithms described herein to the structured input data, adaptive NLP engine 142 may determine that captured utterance 112 corresponds to a balance inquiry involving the credit card account held by user 101, and may identify the third-party entity capable of resolving the balance inquiry (e.g., the financial institution that issued the credit card account to user 101).

In some instances, adaptive NLP engine 142 may package information that identifies and characterizes the balance inquiry involving the credit card account issued to user 101 by the financial institution into corresponding portions of contextual information 146B, and adaptive NLP engine 142 may route textual data 144 and output data 146 (e.g., that includes linguistic elements 146A and contextual information 146B) to a query generation module 148 of executed voice assistant engine 132. When executed by the one or more processors of provider system 130, query generation module 148 may receive textual data 144 and output data 146, and may perform operations that package all or a selected portion of contextual information 146B (e.g., information that identifies the balance inquiry involving the credit card account, information identifying the financial institution, etc.) into a corresponding portion of third-party query data 150.

Query generation module 148 may also include, within third-party query data 150, all or a selected portion of textual data 144 (e.g., the plain text "what is the balance on my credit card"), and in some instances, all or a selected portion of credential data 118 (e.g., the authentication credential of user 101, the IP or MAC address of client device 102, the application-specific cryptogram or digital token associated with executed voice assistant application 104). Further, although not illustrated in FIG. 1B, query generation module 148 may package, within a corresponding portion of third-party query data 150, information that uniquely identifies provider system 130 or executed voice assistant engine 132, such as, but not limited to, a corresponding network address (e.g., an IP address) or a cryptogram or digital token associated with executed voice assistant engine 132 (e.g., an OAuth token). In some instances, query generation module 148 may also perform operations that apply a digital signature 152 to third-party query data 150, e.g., based on a private cryptographic key associated with provider system 130 or with executed voice assistant engine 132.

Based on the portion of contextual information 146B identifying the financial institution that issued the credit card account to user 101, query generation module 148 may perform operations that obtain a network address of a corresponding one of the third-party computing systems associated with, or operated by, that financial institution, e.g., an IP address of third-party system 180. Query generation module 148 may also perform operations that cause provider system 130 to transmit third-party query data 150 and, in some instances, applied digital signature 152 and a public key certificate 154 of provider system 130 or executed voice assistant engine 132 (e.g., that includes a corresponding public cryptographic key of provider system 130 or executed voice assistant engine 132) across network 120 to the network address of third-party system 180.

As illustrated in FIG. 1B, a programmatic interface established and maintained by third-party system 180, e.g., application programming interface (API) 182, may receive and route third-party query data 150 (and in some instances, applied digital signature 152 and public key certificate 154) to a query verification module 184 of third-party system 180. By way of example, and when executed by the one or more processors of third-party system 180, query verification module 184 may parse public key certificate 154 to obtain the public cryptographic key of provider system 130 or executed voice assistant engine 132, and may perform operations that validate applied digital signature 152 based on the obtained public cryptographic key. Further, although not illustrated in FIG. 1B, executed query verification module 184 may also parse third-party query data 150 to obtain the information that uniquely identifies provider system 130 or executed voice assistant engine 132, and to verify an identity of provider system 130 or executed voice assistant engine 132 based on the obtained information.

In some instances, if executed query verification module 184 were unable to validate the applied digital signature, or were unable to verify the identity of provider system 130 or executed voice assistant engine 132 (e.g., based on a determination that the IP address of provider system 130 is inconsistent with a locally maintained reference IP address, or based on a determination that a structure of the cryptogram or digital token associated with executed voice assistant engine 132 fails to correspond to an expected structure), third-party system 180 may decline to respond to third-party query data 150. Query verification module 184 may perform further operations (not illustrated in FIG. 1B) that discard third-party query data 150, that generate an error message indicative of a failed verification of third-party query data 150, and further, that cause third-party system 180 to transmit the error message across network 120 to provider system 130.

Alternatively, if executed query verification module 184 were to validate the applied digital signature, and to verify successfully the identity of provider system 130 or executed voice assistant engine 132, executed query verification module 184 may perform operations that store third-party query data 150 within a corresponding portion of the one or more tangible, non-transitory memories of third-party system 180. As illustrated in FIG. 1B, executed query verification module 184 may provide third-party query data 150 as an input to a data retrieval module 186 of third-party system 180.

When executed by the one or more processors of third-party system 180, data retrieval module 186 may parse third-party query data 150 to access credential data 118, textual data 144, and output data 146, which includes linguistic elements 146A and contextual information 146B. Based on portions of contextual information 146B, data retrieval module 186 may establish that third-party query data 150 specific a balance inquiry involving a credit card account issued to user 101, and based on portions of credential data 118 (e.g., the authentication credential of user 101, the IP address of client device 102, etc.), data retrieval module 186 may access one or more data records 188 within confidential data store 181 that are associated with the credit card account of user 101, and may perform operations that extract data 190 identifying the current balance associated with that credit card account (e.g., $1,274.00). In other examples, not illustrated in FIG. 1B, data retrieval module 186 may perform operations that compute the current balance of the credit card account based on elements of transaction or payment data maintained within data records 188, and may package the computed balance into balance data 190.

In some instances, data retrieval module 186 may provide balance data 190, credential data 118, and all, or selected portions, of textual data 144 and contextual information 146B as inputs to a response generation engine 192 of third-party system 180. When executed by the one or more processors of third-party system 180, response generation engine 192 may perform any of the exemplary processes described herein to generate sequentially ordered elements of textual response data 194 that collectively represent a response to captured utterance 112, e.g., the request for the balance on the credit card.

By way of example, the sequentially ordered elements of textual response data 194 may include one or more elements of text (e.g., "insensitive" elements of text) that neither specify, reference, or implicate any of the sensitive profile, account, or transaction data maintained on behalf of user 101 by third-party system 180, and one or more additional elements of text (e.g., "sensitive" elements of text) that include selected portions of the sensitive profile, account, or transaction data that associated with the query specified within captured utterance 112, such as the $1,274.00 balance of the credit card account specified within balance data 190. In some instances, the sensitive elements may be disposed among, or sandwiched between, certain of the insensitive elements within the sequentially ordered elements of textual response data 194, and when converted to corresponding elements of synthesized speech, represent a natural-language response to captured utterance 112 within the ongoing and simulated conversation between user 101 and the virtual assistant programmatically established by executed voice assistant application 104.

In some instances, executed response generation engine 192 may perform operations that generate the sequentially ordered elements of textual response data 194, including the sensitive and insensitive elements described herein, in accordance with one or more response templates and additionally, or alternatively, in accordance with one or more predetermined rules that specify appropriate responses. For example, each of response templates or predetermined rules may be associated with a particular inquiry type (e.g., a balance inquiry, a credit inquiry, etc.) or a particular inquiry subject (e.g., an investment account, a credit card account, etc.), and third-party system 180 may maintain data identifying and specifying each of the response templates or predetermined rules within a corresponding portion of the one or more tangible, non-transitory memories, e.g., within template and rules data store 183.

Upon receipt of balance data 190, credential data 118, and all, or the selected portions, of textual data 144 and contextual information 146B, an element population module 196 of executed response generation module 192 may parse contextual information 146B to determine the corresponding inquiry type (e.g., the balance inquiry) or the corresponding inquiry subject (e.g., the credit card account held by user 101). Further, element population module 196 may access may access template and rules data store 183 and extract template data 198 that specifies a response template consistent with the corresponding balance inquiry and credit card account. In some instances, the response template within template data 198 may specify may include, but is not limited to: (i) predetermined textual content that specifies one or more insensitive elements of text within textual response data 194; (ii) placeholder content that, once populated with corresponding elements of the confidential profile, account, or transaction data, establish one or more sensitive elements of text within textual response data 194; and (ii) sequence data that specifies an ordering of each of the insensitive and sensitive elements of text within textual response data 194.

For example, the response template may include a leading portion 199A of predetermined textual content (e.g., "The current balance of your credit card account is"), placeholder content 199B associated with the current balance of the credit card account (e.g., "$[[Current Balance]]."), and a trailing portion 199C of predetermined textual content (e.g., "How else can I help you?"). Further, sequence data 199D maintained within the response template may specify that placeholder content 199B should, when populated with the current balance of the credit card account (e.g., $1,274.00, as specified within balance data 190), be disposed between leading portion 199A and trailing portion 199C of predetermined textual content within textual response data 194. The disclosed embodiments are, however, not limited to these exemplary elements of predetermined and placeholder content, and to the exemplary sequence of these elements of predetermined and placeholder content within textual response data 194. In other instances, the response template may specify any additional or alternate elements of predetermined textual content or placeholder content, disposed in any additional or alternate sequence, that would be appropriate to the response to the balance inquiry involving the credit card account issued by user 101.

In some instances, element population module 196 may parse template data 198 and access leading portion 199A of predetermined textual content and trailing portion 199C of predetermined textual content. Element population module 196 may generate a leading element 194A of textual response data 194 that includes leading portion 199A of predetermined textual content (e.g., "The current balance of your credit card account is"), and may also generate a trailing element 194C of textual response data 194 that includes trailing portion 199C of predetermined textual content (e.g., "How else can I help you?"). As described herein, each of leading element 194A and trailing element 194C may correspond to an insensitive element of text within textual response data 194.

Element population module 196 may parse further template data 198 and access placeholder content 199B, which includes a placeholder representative of the current balance of the credit card account. In some examples, element population module 196 may also perform operations that generate a populated element 194B of textual response data 194 by populating, or replacing, the placeholder representative of the current balance of the credit card account (e.g., [[Current Balance]]) with the corresponding value of the current balance (e.g., 1,274.00, as maintained within balance data 190). As described herein, populated element 194B of textual response data 194 (e.g., "$1,274.00") may correspond to a sensitive element of text within textual response data 194.

In some exemplary embodiments, described herein, executed response generation module 192 may perform operations that package leading element 194A, populated element 194B, and trailing element 194C within textual response data 194 in accordance with sequence data 199D, that generate encrypted acoustic data representative of the ordered combination of leading element 194A, populated element 194B, and trailing element 194C, and that transmit the encrypted acoustic data across network 120 directly to client device 102, which may decrypt the encrypted acoustic data and present the decrypted acoustic data to user 101, e.g., via speaker 106B in response to captured utterance 112. Certain of these exemplary processes enable third-party system 180 to bypass the computing systems of the provider of the cloud-based services, and to maintain a confidentiality of sensitive of profile, account, or transaction data, when responding to queries posed by user 101 during an ongoing and simulated conversation between user 101 and a virtual assistant programmatically generated by executed voice assistant application 104. In some instances, one or more of these exemplary processes, as described herein, may be implemented in addition to, or as an alternate to, existing processes that route responsive elements of sensitive profile, account, and transaction data through the computing systems of the cloud-services provider, such as provider system 130, without encryption and without limitation on subsequent usage or distribution.

Figure 2:
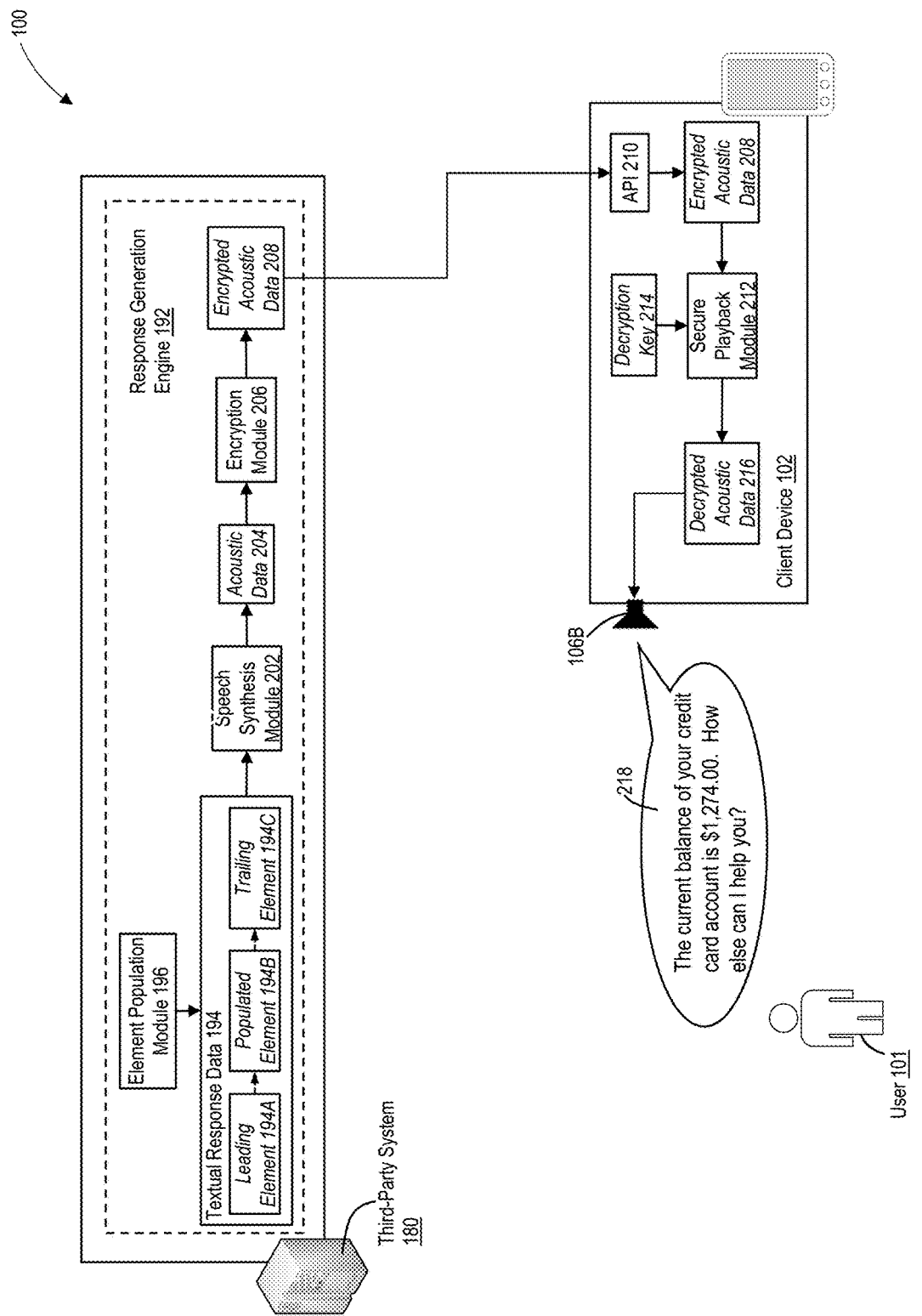

Referring to FIG. 2, element population module 196 may further parse template data 198 and access sequence data 199D, which specifies a sequential ordering of leading element 194A, populated element 194B, and trailing element 194C within textual response data 194 (e.g., that leading element 194A and trailing element 194C sandwich populated element 194B within textual response data 194). Element population module 196 may perform operations that package leading element 194A, populated element 194B, and trailing element 194C into textual response data 194 in accordance with sequence data 199D. For example, and based on a concatenation of leading element 194A, populated element 194B, and trailing element 194C, textual response data 194 include a plain-text response to captured utterance 112 that includes:

"The current balance of your credit card account is $1,274.00. How else can I help you?"

Further, element population module 196 may provide textual response data 194 as an input to a speech synthesis module 202 of executed response generation engine 192 of third-party system 180, which may perform any of the exemplary processes described herein to generate acoustic data 204, e.g., synthesized speech, representative of the plain-text response to captured utterance 112.

In some instances, speech synthesis module 202 may perform operations that apply one or more text-to-speech (TTS) processes or speech-synthesis processes to all or a selected portion of textual response data 194. Based application of these TTS or speech-synthesis processes to the portions of textual response data 194, speech synthesis module 202 may generate elements of synthesized speech representative of the plain-text response to captured utterance 112, and may package the elements of synthesized speech into corresponding portions of acoustic data 204. Examples of these TTS or speech-synthesis processes include, but are not limited to, one or more concatenative synthesis processes that generate synthesized speech based on a concatenation of segments of recorded speech, one or more formant or sinewave-based synthesis processes that generate synthesized speech using additive techniques and corresponding acoustic models, or one or more TTS or speech-synthesis processes based on hidden Markov models (HMMs), e.g., HMM-based processes. In other examples, third-party system 180 may include components distributed across one or more communications networks, such as network 120, and these components may each represent a node within an artificial neural network, such as a deep neural network (DNN), which collectively implement one or more adaptive TTS or speech-synthesis algorithms trained against, and adaptively improved using, corresponding elements of human speech.

Referring back to FIG. 2, speech synthesis module 202 may provide acoustic data 204 as an input to an encryption module 206 of executed response generation engine 192 of third-party system 180, which may perform operations that encrypt acoustic data 204 using a corresponding cryptographic encryption key. In some instances, acoustic data 204 may include compressed audio content (e.g., synthesized speech encoded in a MP3 format, an Advanced Audio Coding (AAC) format, a Waveform Audio File (WAV) format, etc.), and examples of the cryptographic encryption key include, but are not limited to, a public cryptographic key associated with client device 102 or executed voice assistant application 104, a symmetric encryption key (e.g., associated with a Secure Sockets Layer (SSL) cryptographic protocol or a Transport Layer Security (TLS) protocol, etc.), or a homomorphic encryption key provisioned and securely maintained by client device 102. In some instances, encryption module 206 may output encrypted acoustic data 208, and may perform operations that cause third-party system 180 to transmit encrypted acoustic data 208 across network 120 to client device 102.

In some examples, encrypted acoustic data 208 may represent an asynchronous response to third-party query data 150 that bypasses the computing systems associated with the cloud-services provider, including provider system 130. Certain of these exemplary processes, which facilitate an asynchronous response by third-party system 180 to one or more requests captured during the ongoing and simulated conversation between user 101 and the virtual assistant programmatically generated by executed voice assistant application 104, may reduce a likelihood that entities unrelated to user 101 or the financial system that operates third-party system 180, such as the provider of the cloud-based services, may access, locally maintain, or distributed the elements of sensitive profile, account, or transaction data included within encrypted acoustic data 208.

A programmatic interface established and maintained by client device 102, such as an application programming interface (API) 210, may receive encrypted acoustic data 208, and may route encrypted acoustic data 208 to a secure playback module 212 of executed voice assistant application 104. As illustrated in FIG. 2, and upon execution by the one or more processors of client device 102 (e.g., based on programmatic commands generated by executed voice assistant application 104), secure playback module 212 may access a decryption key 214 locally maintained within the one or more tangible, non-transitory memories of client device 102, and may perform operations that decrypt encrypted acoustic data 208 using decryption key 214. Decryption key 214 may include, but is not limited to, a private cryptographic key of client device 102 or of executed voice assistant application 104, a symmetric decryption key (e.g., associated with a Secure Sockets Layer (SSL) cryptographic protocol or a Transport Layer Security (TLS) protocol, etc.), or a homomorphic encryption key provisioned by third-party system 180.

In some instances, client device 102 may maintain decryption key 214 within a secure portion of the one or more tangible, non-transitory memories, such as a hardware-based key manager or a secure enclave, that is accessible to secure playback module 212 of executed voice assistant application 104. As illustrated in FIG. 2, executed secure playback module 212 may route now-decrypted acoustic data 216 to speaker 106B, which may present decrypted acoustic data 216 as a verbal response 218 to captured utterance 112 (e.g., "The current balance of your credit card account is $1,274.00. How else can I help you?") within the ongoing and simulated conversation between user 101 and the virtual assistant programmatically established by executed voice assistant application 104.

In other examples, not illustrated in FIG. 2, executed secure playback module 212 may perform operations that cause client device 102 to transmit decrypted acoustic data 216 across direct communications channel 122 to voice-enabled device 102A, e.g., the wireless smart speaker described herein. One or more application programs executed by voice-enabled device 102A, such as a local voice assistant application (not illustrated in FIG. 2), may receive decrypted acoustic data 216 through a corresponding programmatic interface, and may route decrypted acoustic data 216 to a speaker or other acoustic interface, which may present decrypted acoustic data 216 to user 101 in response to captured utterance 112. Executed secure playback module 212 may perform similar operations to transmit decrypted acoustic data 216 to additional or alternate voice-enabled devices coupled communicatively to client device 102 within environment 100.

Through the generation and transmission of an asynchronous, encrypted response to captured utterance 112 directly from third-party system 180 to executed voice assistant application 104, certain of the exemplary processes described herein may reduce a likelihood that the provider of the cloud-based services may, without authorization or consent, access, locally maintain or process, or distribute the elements of sensitive profile, account, or transaction data requested by user 101 through captured utterance 112. In other examples, described herein in reference for FIGS. 3A-3C, third-party system 180 may generate an encrypted, and partially encoded, synchronous response to captured utterance 112, which third-party system 180 may transmit to voice assistant application 104 through one or more of the computing systems associated with the cloud-services provider, such as provider system 130. The encrypted and partially encoded synchronous response may, for example, include ultrasonically encoded elements of the sensitive profile, account, or transaction data requested by user 101 (e.g., through captured utterance 112) in conjunction within other insensitive and un-coded elements of textual content, and may maintain the confidentiality of the elements of sensitive profile, account, or transaction data when transmitted to and processed by provider system 130 through across public communications networks.

Figure 3A:
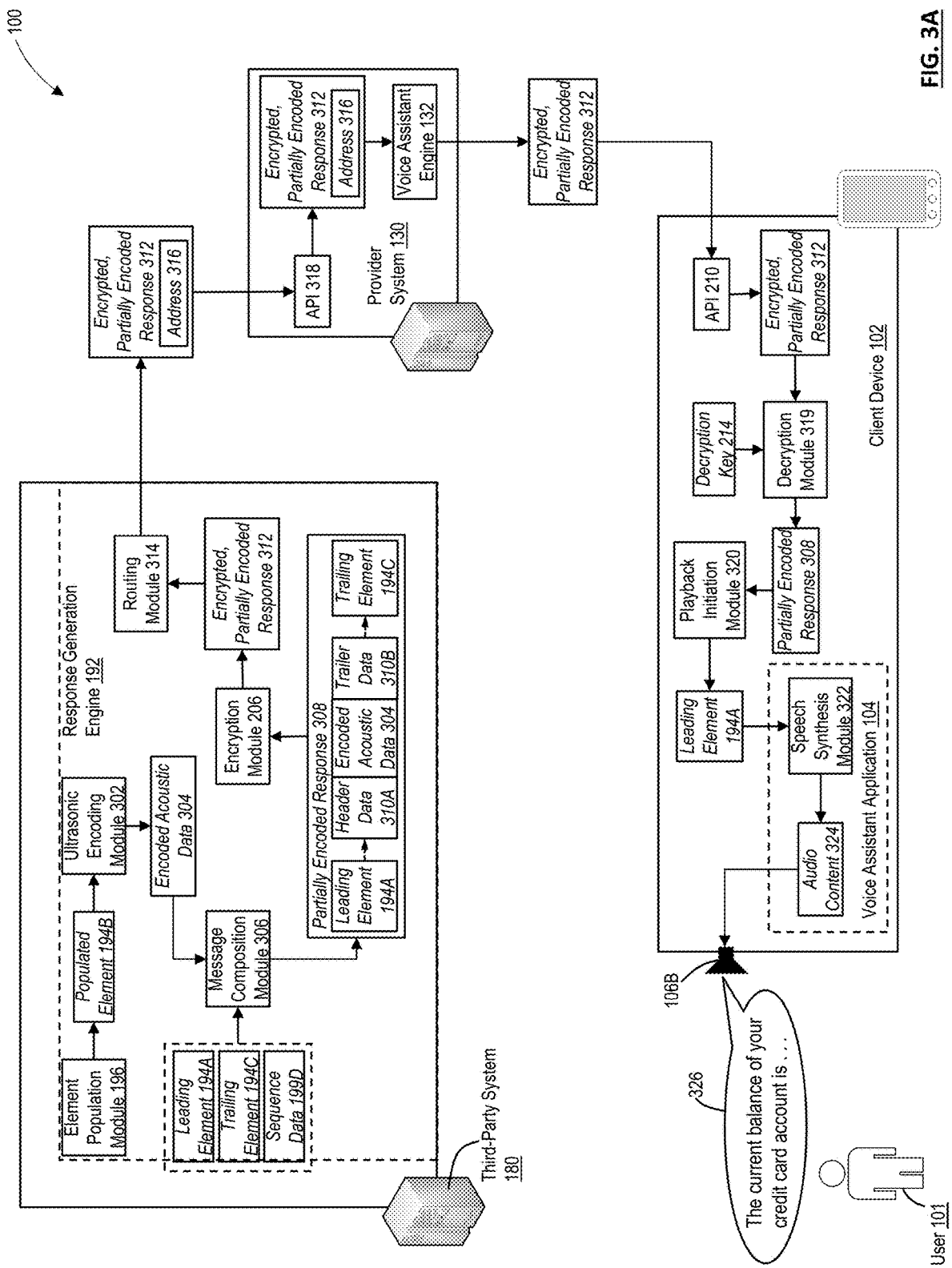

Referring to FIG. 3A, element population module 196 may provide populated element 194B, which includes the sensitive balance of the credit card account held by user 101 (e.g., "$1,240."), as an input to an ultrasonic encoding module 302 of executed response generation engine 192. In some instances, ultrasonic encoding module 302 may apply one or more ultrasonic encoding protocols to all, or a selected portion, of populated element 194B. Through the application of the one or more ultrasonic encoding protocols, executed ultrasonic encoding module 302 may encode populated element 194B into a series of ultrasonic tones, and may generate encoded acoustic data 304 representative of the ultrasonically encoded balance of the credit card account held by user 101. Examples of these ultrasonic encoding protocols include, but are not limited to, to a LISNR™ encoding protocol or a ToneTag™ encoding protocol.

Executed ultrasonic encoding module 302 may provide encoded acoustic data 304, which includes the ultrasonically encoded balance of the credit card account, as input to a message composition module 306 of executed response generation engine 192. Further, as illustrated in FIG. 3A, element population module 196 may also provide leading element 194A, trailing element 194C, and sequence data 199D (e.g., that specifies the sequential ordering of leading element 194A, populated element 194B, and trailing element 194C), as additional inputs to message composition module 306. In some instances, message composition module 306 may generate a partially encoded response message 308, which includes leading element 194A, encoded acoustic data 304 (e.g., that includes the ultrasonically encoded balance of the credit card account, as specified within populated element 194B), and trailing element 194C arranged in accordance with sequence data 199D. As described herein, leading element 194A and trailing element 194C may each include insensitive elements of predetermined textual content (e.g., respective ones of "The current balance of your credit card account is," and "How else can I help you?"). Further, encoded acoustic data 304 may be representative of the sensitive balance of the credit card account, the confidentiality of which may be maintained through the application of the one or more ultrasonic encoding protocol to populated element 194B.

In some instances, and prior to packaging encoded acoustic data 304 into the corresponding portion of partially encoded response message 308, executed message composition module 306 may also perform operations that generate, and apply, corresponding ones of header data 310A and trailer data 310B to respective leading and trailing portions of encoded acoustic data 304. In some instances, when processed at client device 102 by voice assistant application 104, header data 310A may be indicative of a first predetermined delay between the presentation of first synthesized speech representative of leading element 194A and the presentation of second synthesized speech representative of the current balance of the credit card account, and trailer data 310B may be indicative of a second predetermined delay between the presentation of the second synthesized speech and third synthesized speech representative of trailing element 194C. Exemplary durations of the first and second predetermined delays may include, but are not limited to, one second, three seconds, or five seconds, and in some examples, the first predetermined duration may be equivalent to the second predetermined duration.

As illustrated in FIG. 3A, executed message composition module 306 may route partially encoded response message 308, which includes leading element 194A, encoded acoustic data 304 and applied header data 310A and trailer data 310B, and trailing element 194C, as inputs to encryption module 206 of executed response generation engine 192. For example, when executed by the one or more processors of third-party system 180, encryption module 206 may perform operations that encrypt partially encoded response message 308 using a corresponding encryption key. As described herein, the corresponding encryption key may include the public cryptographic key associated with client device 102 or executed voice assistant application 104, a symmetric encryption key (e.g., associated with a Secure Sockets Layer (SSL) cryptographic protocol or a Transport Layer Security (TLS) protocol, etc.), or a homomorphic encryption key provisioned and securely maintained by client device 102. In some instances, encryption module may provide encrypted, partially encoded response message 312 to a routing module 314 of executed response generation engine 192.

In some instances, routing module 314 may perform operations that obtain a unique network address 316 of client device 102 (e.g., from a corresponding portion of credential data 118, as maintained within the one or more tangible, non-transitory memories of third-party system 180), and may package network address 316 within a corresponding portion of encrypted, partially encoded response message 312. Further, routing module 314 may perform additional operations that cause third-party system 180 to transmit encrypted, partially encoded response message 312 across network 120 to one or more of the computing systems associated with the provider of the cloud-based services, e.g., as a synchronous response to third-party query data 150.

By way of example, provider system 130 may receive encrypted, partially encoded response message 312 through a secure, programmatic interface, such as application programming interface (API) 318, which may route encrypted, partially encoded response message 312 to executed voice assistant engine 132. In some instances, executed voice assistant engine 132 may parse encrypted, partially encoded response message 312 to identify network address 316 of client device 102 (e.g., an IP address, etc.), and may perform operations that route encrypted, partially encoded response message 312 across network 120 to client device 102. As illustrated in FIG. 3A, although executed voice assistant engine 132 may access network address 316 within encrypted, partially encoded response message 312, executed voice assistant engine 132 may be incapable of accessing encoded acoustic data 304 representative of the sensitive balance of user 101's credit card account (even if an appropriate decryption key, such as the symmetric decryption key described herein, were available locally at provider system 130).

A programmatic interface established and maintained by client device 102, such as API 210, may receive encrypted, partially encoded response message 312, and may route encrypted, partially encoded response message 312 to a decryption module 319 of executed voice assistant application 104. As illustrated in FIG. 3A, and upon execution by the one or more processors of client device 102 (e.g., based on programmatic commands generated by executed voice assistant application 104), decryption module 319 may access decryption key 214 locally maintained within the one or more tangible, non-transitory memories of client device 102, and may perform operations that decrypt encrypted, partially encoded response message 312 using decryption key 214, and that provide now-decrypted partially encoded response message 308 to a playback initiation module 320 of executed voice assistant application 104. Upon execution by the one or more processors of client device 102, playback initiation module 320 may perform operations that parse sequentially the elements of partially encoded response message 308 to detect a presence of un-encoded, insensitive data, a presence of header or trailer data, or a presence of sensitive encoded data, and further, to initiate a performance of additional operations consistent with respective ones of the insensitive un-encoded data, the header or trailer data, and the sensitive encoded data.

For example, as illustrated in FIG. 3A, playback initiation module 320 may parse partially encoded response message 308 and detect a presence of leading element 194A, which includes un-encoded and insensitive elements of predetermined textual content (e.g., "The current balance of your credit card account is"). Based on a determination that the predetermined textual content corresponds to insensitive and un-encoded data, playback initiation module 320 may route leading elements 194A to a speech synthesis module 322 of executed voice assistant application 104, which may apply any one or more of the TTS processes or speech-synthesis processes described herein to all or a selected portion of leading element 194A. Based on the application of the one or more of the TTS processes or speech-synthesis processes to leading element 194A, speech synthesis module 322 may generate elements of audio content 324 that represent leading element 194A (e.g., synthesized speech representative of "The current balance of your credit card account is"), and may route audio content elements 324 to speaker 106B, which may present audio content elements 324 as a first partial response 326 to captured utterance 112 (e.g., "The current balance of your credit card account is . . . ") within the ongoing and simulated conversation between user 101 and the virtual assistant programmatically established by executed voice assistant application 104.

Figure 3B:
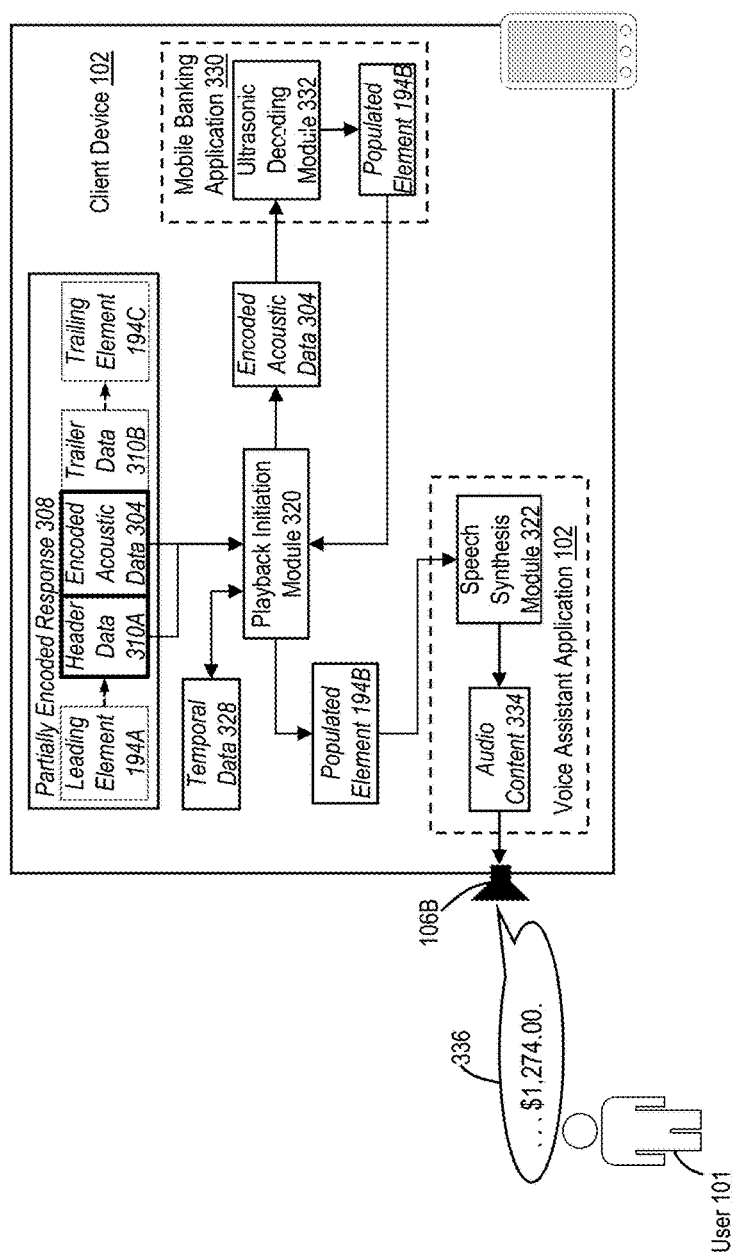

Referring to FIG. 3B, and upon presentation of first partial response 326, executed playback initiation module 320 may further parse sequentially the elements of partially encoded response message 308, and may detect a presence of header data 310A associated with encoded acoustic data 304. In some instances, and responsive to the detection of header data 310A, playback initiation module 320 may determine a duration of the predetermined delay associated with header data 310A (e.g., one second, three seconds, five seconds, etc.), and generate and store temporal data 328 indicative of the determined duration of the predetermined delay. Playback initiation module 320 may further parse sequentially the elements of partially encoded response message 308, and may detect a presence of encoded acoustic data 304, which represents the sensitive balance of the credit card account held by user 101.

Based on a determination that the encoded acoustic data 304 correspondence to sensitive, encoded data (e.g., the $1,274.00 balance of the credit card account), executed playback initiation module 320 may perform operations that trigger an execution of a mobile application associated with third-party system 180 by the one or more processors of client device 102. In some instances, the executed mobile application may correspond to a mobile banking application 330, which may be associated with the financial institution that operated third-party system 180, and which may be provisioned (e.g., transmitted) to client device 102 by third-party system 180. As illustrated in FIG. 3B, and upon execution of mobile banking application 330, playback initiation module 320 may perform operations that provide encoded acoustic data 304 as an input to an ultrasonic decoding module 332 integrated into, or operative with, executed mobile banking application 330 (e.g., through a corresponding programmatic interface).

Upon execution, ultrasonic decoding module 332 may perform operations that decode the encoded acoustic data 304 in accordance with a corresponding one of the exemplary ultrasonic encoding schemes described herein, e.g., as applied to populated element 194B by ultrasonic encoding module 302 executed at third-party system 180. As illustrated in FIG. 3B, executed ultrasonic decoding module 332 may route now-decoded populated element 194B (e.g. that specifies the $1,274.00 current balance of user 101's credit card account) back to playback initiation module 320 of executed voice assistant application 104.

In some examples, as described herein, ultrasonic decoding module 332 of executed mobile banking application 330 may perform operations that decode encoded acoustic data 304 based on a determination, by playback initiation module 320 of executed voice assistant application 104, that encoded acoustic data 304 represents encoded and sensitive data. In other instances, not illustrated in FIG. 3B, executed voice assistant application 104 may include one or more additional executable application modules or widgets that, upon the determination that encoded acoustic data 304 represents encoded and sensitive data, perform one or more operations locally to decode the encoded acoustic data 304 in accordance with a corresponding one of the exemplary ultrasonic encoding schemes described herein, e.g., without provision of encoded acoustic data 304 to executed mobile banking application 330.

Referring back to FIG. 3B, executed playback initiation module 320 may receive populated element 194B, e.g., through a corresponding programmatic interface. Upon expiration of the duration of the predetermined delay associated with header data 310A, e.g., as specified within locally maintained temporal data 328, executed playback initiation module 320 may provide populated element 194B as an input to speech synthesis module 322 of executed voice assistant application 104, which may apply any one or more of the TTS processes or speech-synthesis processes described herein to all or a selected portion of populated element 194B, e.g., the $1,274.00 balance of user 101's credit card. Based on the application of the one or more of the TTS processes or speech-synthesis processes to populated element 194B, executed speech synthesis module 322 may generate elements of audio content 334 that represent populated element 194B (e.g., synthesized speech representative of "$1,274.00"), and may route audio content element 334 to speaker 106B, which may present audio content elements 334 as a second partial response 336 to captured utterance 112 (e.g., " . . . $1,274.00.") within the simulated conversation between user 101 and the virtual assistant programmatically established by executed voice assistant application 104.

Figure 3C:
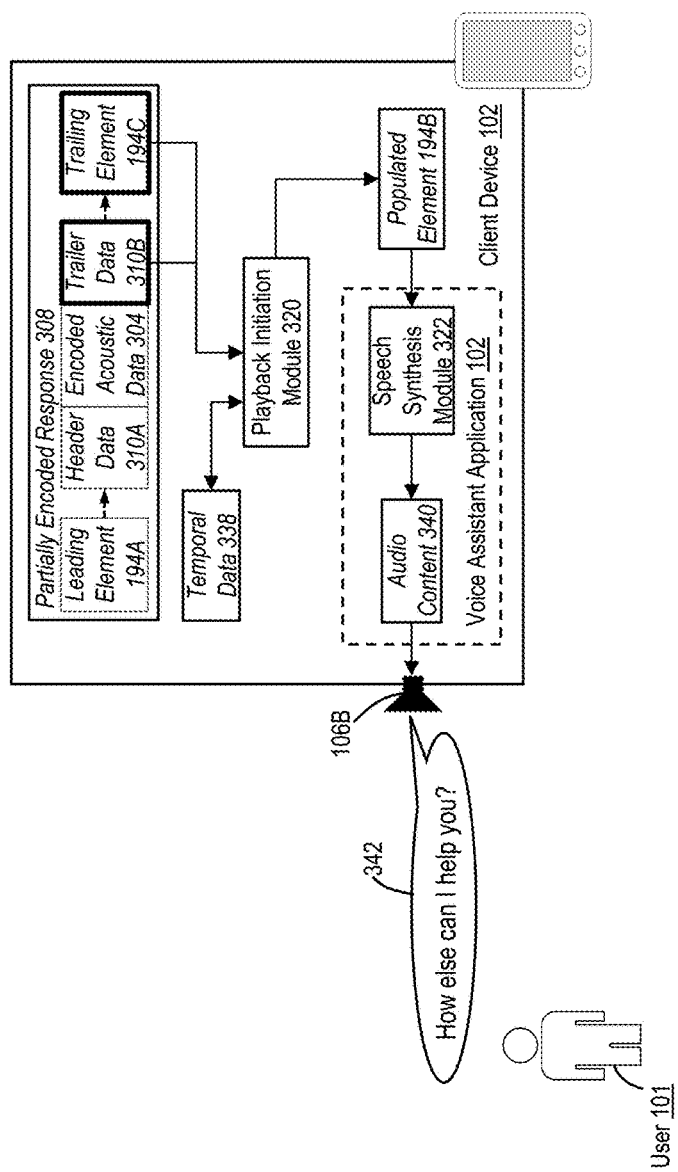

Referring to FIG. 3C, and upon presentation of second partial response 336, executed playback initiation module 320 may further parse sequentially the elements of partially encoded response message 308, and may detect a presence of trailer data 310B associated with encoded acoustic data 304. In some instances, and responsive to the detection of trailer data 310B, executed playback initiation module 320 may determine a duration of the predetermined delay associated with trailer data 310B (e.g., one second, three seconds, five seconds, etc.), and generate and store temporal data 338 indicative of the determined duration of the predetermined delay. Executed playback initiation module 320 may further parse sequentially the elements of partially encoded response message 308, and may detect a presence of trailing element 194C, which includes additional un-encoded and insensitive elements of predetermined textual content (e.g., "How else can I help you?").

Based on a determination that the predetermined textual content corresponds to additional elements of insensitive and un-encoded data, and upon expiration of the duration of the predetermined delay associated with trailer data 310B (e.g., as specified within locally maintained temporal data 338), executed playback initiation module 320 may route trailing element 194C to speech synthesis module 322 of executed voice assistant application 104. Upon receipt of trailing element 194C, speech synthesis module 322 may apply one or more of the TTS processes or speech-synthesis processes described herein to all or a selected portion of trailing element 194C. Based on the application of the one or more of the TTS processes or speech-synthesis processes to trailing element 194C, executed speech synthesis module 322 may generate elements of audio content 340 that represent trailing element 194C (e.g., synthesized speech representative of "How else can I help you?"), and may route audio content elements 340 to speaker 106B, which may present audio content elements 340 as a third and final partial response 342 to captured utterance 112 (e.g., "How else can I help you?") within the simulated conversation between user 101 and the virtual assistant programmatically established by executed voice assistant application 104.

In other examples, not illustrated in FIGS. 3A, 3B, and 3B, executed voice assistant application 104 may perform operations that cause client device 102 to transmit one or more of audio content 324, audio content 334, or audio content 340 across direct communications channel 122 to voice-enabled device 102A, e.g., the wireless smart speaker described herein. One or more application programs executed by voice-enabled device 102A, such as a local voice assistant application (not illustrated in FIG. 2), may receive audio content 324, audio content 334, or audio content 340 through a programmatic interface, and may route audio content 324, audio content 334, or audio content 340 to a speaker or other acoustic interface, e.g., for presentation to user 101 as a corresponding partial response to captured utterance 112. Executed voice assistant application 104 may perform similar operations to transmit one or more of audio content 324, audio content 334, or audio content 340 to additional or alternate voice-enabled devices coupled communicatively to client device 102 within environment 100.

As described herein, client device 102, operating individually or in conjunction with voice-enabled device 102A, may capture one or more utterances of user 101 during an ongoing and simulated conversation between user 101 and a virtual assistant programmatically generated by executed voice assistant application 104. In some instances, executed voice assistant application 104 may perform operations that cause client device 102 (or alternatively, voice-enabled device 102A) to transmit audio content representative of these captured utterances to one or more computing systems operated by a cloud-services provider, such as provider system 130, which may apply one or more of the natural language processing (NLP) processes or algorithms described herein to the audio content, which converts that audio content into corresponding text, and upon an application of additional or alternate ones of these NLP processes or algorithms to the corresponding text, determine an intent or meaning of that audio content.

The computing systems of the cloud-services provider, including provider system 130, may perform operations that generate one or more commands indicative of that determined meaning or intent, and transmit these generated commands one or more third-party computing systems, such as third-party system 180, which may perform operations consistent with the generated commands. In some instances, the computing systems of the cloud-services provider, such as provider system 130, may also receive data responsive to the generated commands from the third-party computing systems, such as third-party system 180, and may route the received data back to executed voice assistant application 104, e.g., for audible presentation to user 101 during the congoing and simulated conversation with the virtual assistant. Further, the computing systems of the cloud-services provider, including provider system 130, may locally maintain data that includes the generated commands and the received responses, which may be leveraged to train and adaptively improve the one or more adaptive, natural language processing (NLP) processes or algorithms.

By way of example, the one or more of the captured utterances may correspond to a request, by user 101, to obtain one or more elements of sensitive data maintained on behalf of user 101 at third-party system 180 (e.g., the request for the current balance of the credit card account described herein), and the response data received by provider system 130 from third-party system 180 may include the requested elements of sensitive data. As the exchanges of data between client device 102, provider system 130, and third-party system 180 may occur "in the clear" and without encryption, certain of these data exchanges may expose the elements of sensitive data to unauthorized access or distribution by other devices or systems operating within environment 100 (e.g., via a man-in-the-middle attack, etc.). Further, as provider system 130 (and the other computing systems associated with the provider of the cloud-based services), may perform operations that train, and adaptively improve, certain of the NLP processes or algorithms based on selected combination of the received audio content, the generated comments, and/or the responsive elements of sensitive data, which may be inconsistent with a prior access, maintenance, or distribution permission granted by user 101 to provider system 130.

In order to maintain the confidentiality of sensitive elements of profile, account, or transaction data requested by user 101 during interaction with the programmatically generated virtual assistants described herein, and while maintaining a reliance on provider system 130 (and on other computing systems of the cloud-services provider) to determine a content, meaning, or intent of that interaction based on an application of the adaptive, NLP processes or algorithms to corresponding elements of audio content, third-party system 180 may perform any of the exemplary processes described herein to generate and transmit an asynchronous encrypted response that includes the requested elements of profile, account, or transaction data directly across network 120 to client device 102 (e.g., bypassing provider system 130), and additionally, or alternatively, to generate and transmit, to client device 102 via provider system 130, an encrypted synchronous response that includes an ultrasonically encoded representation of the requested elements of sensitive profile, account, or transaction data (e.g., an encrypted, partially encoded response).

In further examples, described below in reference to FIGS. 4A-4C, certain of the disclosed embodiments enable provider system 130, (and others of the computing systems of the provider of the cloud-based services) to perform operations that adaptively train, and improve, one or more of the exemplary NLP processes or algorithms based not on raw, unencrypted elements of training data, but instead based on homomorphically encrypted elements of training data, such as that characterizing audio content generated by one or more voice assistant applications executed by the voice-enabled devices operating within environment 100. In some instances, and based on an application of the homomorphically trained NLP processes or algorithms (e.g., "homomorphic" NLP processes or algorithms) to homomorphically encrypted input data characterizing audio content generated by voice assistant application 104 executed at client device 102, provider system 130 may interpret an underlying command embodied by the homomorphically encrypted input data, and may route the homomorphically encrypted command to a third-party computing system, such as third-party system 180, capable of decrypting and processing the homomorphically encrypted command, parsing a content, meaning, or intent of the decrypted command, and generating an encrypted response for processing by the client device 102. Certain of these exemplary processes, when implemented collectively by client device 102, provider system 130, and third-party system 180, may maintain the confidentiality of the sensitive elements of profile, account, or transaction data when transmitted across a public communications network and in some instances, when processed by and routed through provider system 130 and other computing systems associated with the provider of the cloud-based services.

Figure 4A:
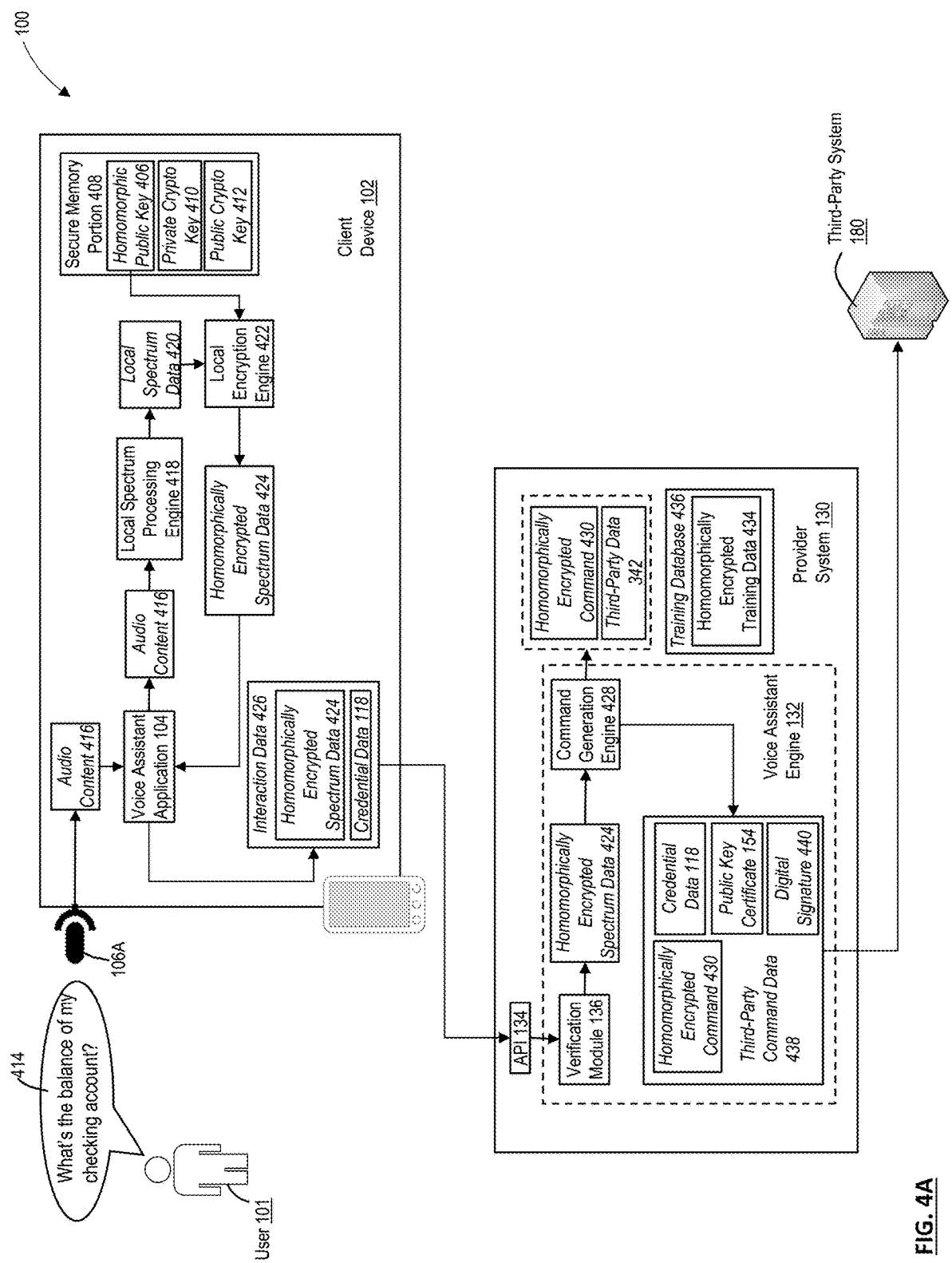
Figure 4B:
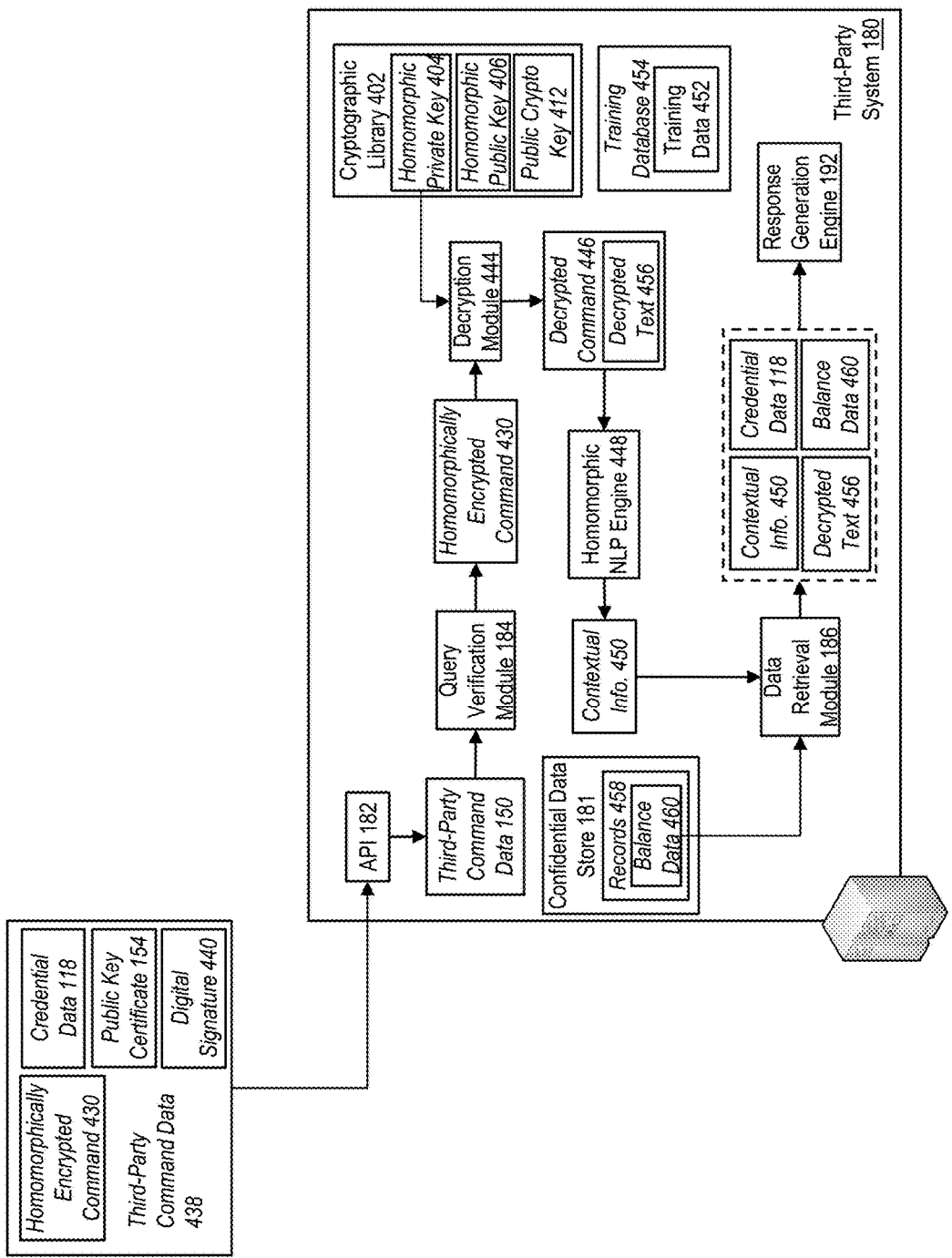
Figure 4C:
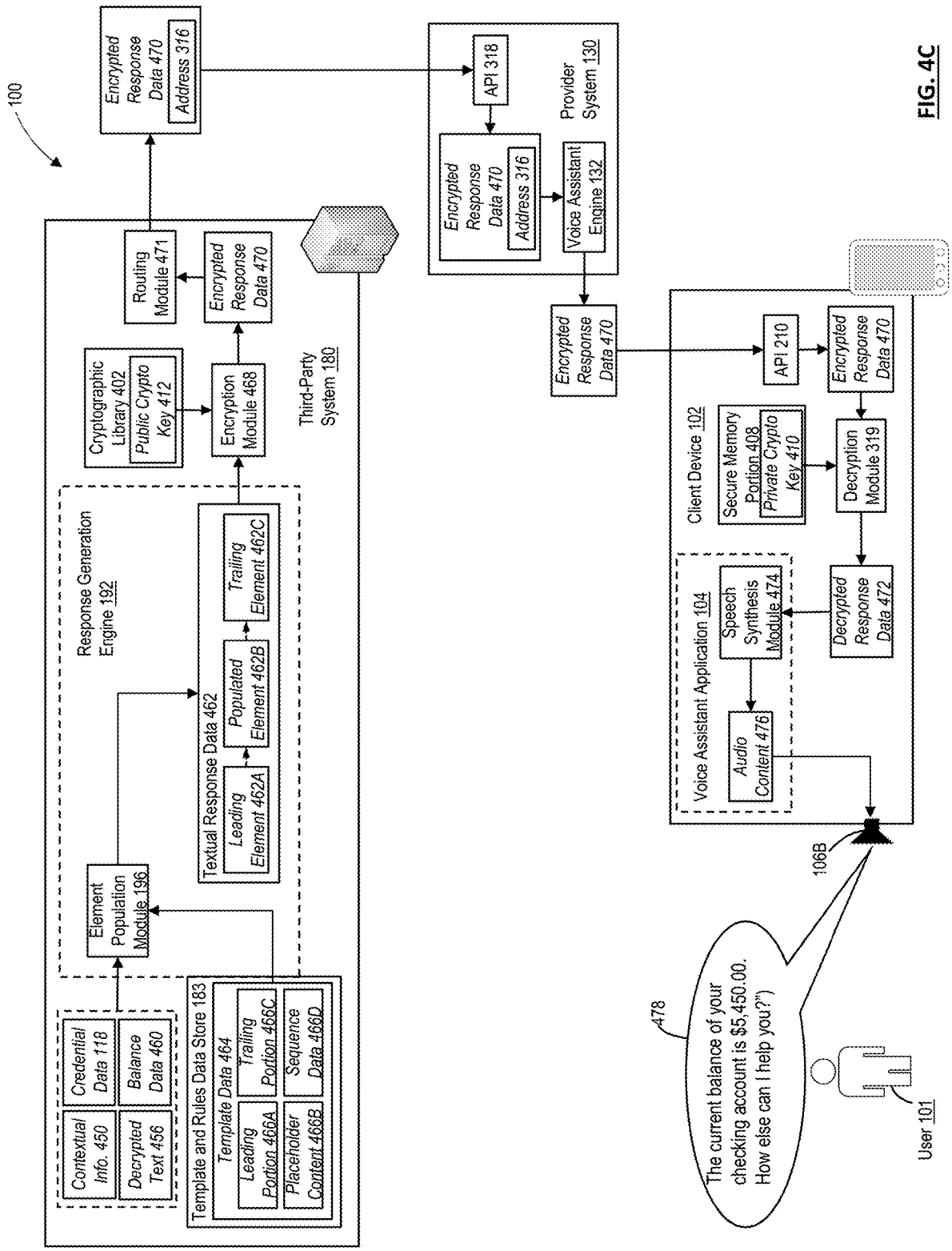

As illustrated in FIGS. 4A-4C, third-party system 180 may maintain, within the one or more tangible, non-transitory memories, a cryptographic library 402 that includes, among other things, an asymmetric cryptographic key pair associated with or assigned to associated with one or more voice-enabled devices operating within environment 100, and additionally, or alternatively, one or more voice assistant applications executed by the voice-enabled devices. The asymmetric cryptographic key pair may include a homomorphic private cryptographic key and a corresponding homomorphic public cryptographic key, which may be generated in accordance with one or more homomorphic encryption schemes.

In some instances, the one or more homomorphic encryption schemes may include a partially homomorphic encryption scheme, such as, but not limited to, an unpadded RSA encryption scheme, an El-Gamal encryption scheme, or a Pailler encryption scheme. In other instances, and as described herein, the one or more homomorphic encryption schemes may include a fully homomorphic encryption scheme, which facilities arbitrary computations on ciphertext and generates encrypted results that, when decrypted, match the results of the arbitrary computations performed on corresponding elements of plaintext. Examples of these fully homomorphic encryption schemes include but are not limited to, a TFHE scheme that facilitates verifiable computations on integer ciphertext, a SEAL encryption scheme, or a PALISADE encryption scheme that facilitates verifiable computations on floating-point ciphertext.

For example, third-party system 180 may maintain, within cryptographic library 402, a homomorphic private key 404 and a homomorphic public key 406, each of which may be associated with, or assigned to, client device 102 and executed voice assistant application 104. Third-party system 180 may also associate, within cryptographic library 402 a unique identifier of client device 102 (e.g., an IP or MAC address, etc.) or executed voice assistant application 104 (e.g., an application-specific cryptogram, digital token, hash, etc.) with respective ones of homomorphic private and public keys 404 and 406. Additionally, although not illustrated in FIGS. 4A-4C, third-party system 180 may also maintain, within cryptographic library 402, homomorphic private and public keys and a unique device or application identifier for each of one or more additional, or alternate, voice-enabled devices operating within environment 100 or voice assistant applications executed by these voice-enabled devices.

In some instances, third-party system 180 may perform operations that provision homomorphic public key 406 to client device 102, e.g., by transmitting homomorphic public key 406 across network 120 to client device 102 via a secure, programmatic interface. By way of example, third-party system 180 may transmit homomorphic public key 406 across network 120 to client device 102 based on a successful completion of an initial registration and onboarding process, e.g., through which third-party system 180 generates authentication credentials granting user 101 access to the elements of sensitive profile, account, and transaction data maintained locally at third-party system 180 (e.g., via mobile banking application 330) and associates client device 102 with the generated authentication credentials. Client device 102 may receive homomorphic public key 406 (e.g., via the secure, programmatic interface), and may perform operations that store homomorphic public key 406 within a secure portion 408 of the one or more tangible, non-transitory memories, such as a hardware-based key manager or a secure enclave. Secure memory portion 408 (e.g., the hardware-based key manager or the secure enclave) may be accessible to one or more application programs executed by client device 102, such as executed voice assistant application 104 or other application programs, engines, or modules operative with executed voice assistant application 104, but may isolated from other application one or more processors of client device 102 to provide an additional layer of security for homomorphic public key 406.

Third-party system 180 may also perform operations that provision (e.g., transmit across network 120 via a secure, programmatic interface) homomorphic public key 406 to one or more additional voice-enabled devices operating within environment 100, such as voice-enabled device 102A, and further, to one or more computing systems associated with the provider of the cloud-based services, such as provider system 130. Although not illustrated in FIGS. 4A-4C, voice-enabled device 102A, provider system 130, and other ones of the additional voice-enabled devices and the computing systems associated with the provider of the cloud-based services may store homomorphic public key 406 within a corresponding secure portion of the one or more tangible memories, such as the hardware-based key managers or the secure enclaves described herein. Further, the disclosed embodiments are not limited to processes that provision homomorphic public key 406 to client device 102, voice-enabled device 102A, provider system 130, or other network-connected devices or systems operating within environment 100 based on secure communications across network 120, and on other instances, third-party system 180 may perform operations that store homomorphic public key 406 within a secure computing device, such as a hardware security module (HSM), which may be provided through out-of-band communication channels to one or more of client device 102, voice-enabled device 102A, provider system 130, or other network-connected devices or systems operating within environment 100.

Client device 102 may also perform operations that generate an additional asymmetric key pair associated with, or assigned to, executed voice assistant application 104. For example, client device 102 may generate a private cryptographic key 410 and a corresponding public cryptographic key 412 using one or more key-generation algorithms or protocols, and may perform operations that store respective ones of private and private cryptographic keys 410 and 412 within secure portion 408 of the one or more tangible, non-transitory memories, e.g., the hardware-based key manager or the secure enclave described herein. Examples of these key-generation algorithms or protocols include, but are not limited to, a Diffie-Hellman key exchange protocol, a Digital Signature Standard (DSS) key generation algorithm, or an elliptic-curve algorithm, or an RSA encryption algorithm. Further, client device 102 may perform additional operations that provision (e.g., transmit across network 120 via a secure, programmatic interface) public cryptographic key 412 to third-party system 180, which may store public cryptographic key 412 within a corresponding portion of cryptographic library 402, along with an IP address or other identifier of client device 102.

Referring to FIG. 4A, and responsive to the presentation by speaker 106B of third and final partial response 342 to captured utterance 112 (e.g., "How else can I help you?"), microphone 106A of client device 102 may capture a further utterance 414 of user 101 that requests the current balance of a checking account held by user 101 (e.g., "What's the balance of my checking account"). Microphone 106A may route audio content 416 representative of utterance 414 to executed voice assistant application 104, which may generate programmatic commands that execute a local spectrum processing engine 418 of client device 102. In some instances, executed local spectrum processing engine 418 may be integrated into, may represent a modular component of, or may be operative with executed voice assistant application 104.

Based on received audio content 416, executed local spectrum processing engine 418 may perform any of the exemplary processes described here into generate local spectrum data 420 representative of a short-term power spectrum of captured utterance 414. In some instances, the representation of the short-term power spectrum of captured utterance 414 may correspond to a mel-frequency cepstrum (MFC) of captured utterance 414, and local spectrum data 420 may include mel-frequency cepstrum coefficients (MFCCs) that collectively establish the mel-frequency cepstrum (MFC). Executed local spectrum processing engine 418 may, for instance, perform any of the exemplary processes described herein (e.g., in reference to executed spectrum processing module 138 of provider system 130) to derive the MFCCs for captured utterance 414 and to package the derived MFCCs into corresponding portion of local spectrum data 420.

Further, executed voice assistant application 104 may generate additional programmatic commands that execute a local encryption engine 422, which may be integrated into, may represent a modular component of, or may be operative with executed voice assistant application 104. Executed local encryption engine 422 may receive local spectrum data 420 (e.g., that includes the MFCCs derived from audio content 416), obtain homomorphic public key 406 from secure portion 408 of the one or more tangible, non-transitory memories (e.g., the hardware-based key manager or secure enclave), and encrypt local spectrum data 420 using homomorphic public key 406. For example, executed local encryption engine 422 may encrypt each of the MFCCs within local spectrum data 420 using homomorphic public key 406, and may package each of the homomorphically encrypted MFCCs into a corresponding portion of homomorphically encrypted spectrum data 424. As illustrated in FIG. 4A, executed local encryption engine 422 may route homomorphically encrypted spectrum data 424 back to executed voice assistant application 104, e.g., via a corresponding programmatic interface.

In some instances, executed voice assistant application 104 may package homomorphically encrypted spectrum data 424, which includes the homomorphically encrypted MFCCs representative of audio content 416 (and as such, captured utterance 414), into a corresponding portion of interaction data 426. Further, executed voice assistant application 104 may also package, into an additional portion of interaction data 426, one or more elements of credential data 118 that uniquely identify user 101, client device 102, or alternatively, executed voice assistant application 104. Examples of credential data 118 may include, but are not limited to, an authentication credential of user 101, a network address associated with client device 102 (e.g., an IP address, etc.), or an application-specific cryptogram, digital token (e.g., the OAuth token described herein), hash value, random number, or other element of cryptographic data that uniquely identifies executed voice assistant application 104.

Executed voice assistant application 104 may perform operations that cause client device 102 to transmit interaction data 426 across network 120 to one of more of the computing systems associated with the provider of the cloud-based services, such as provider system 130. As illustrated in FIG. 4A, a programmatic interface established and maintained by provider system 130, such API 134, may receive and route interaction data 426 to verification module 136 of executed voice assistant engine 132, which may perform any of the exemplary processes described herein to verify interaction data 426 based on all or a selected portion of credential data 118. If, for example, verification module 136 were unable to verify interaction data 426 (e.g., based on the determination that voice assistant application 104 does not represent a valid provisioned application program, based on the determination that user 101 does not represents a registered user, and/or based on the determination that client device 102 is not associated with a registered user), executed voice assistant engine 132 may discard interaction data 426, and may generate an error message indicative of the failed verification of interaction data 426 (not illustrated in FIG. 4A). Provider system 130 may transmit the generated error message across network 120 to client device 102, and executed voice assistant application 104 may generate an audible representation of the generated error message (e.g., elements of synthesized speech) for presentation to user 101, e.g., via speaker 106B (also not illustrated in FIG. 4A).

In other examples, if verification module 136 were able to verify interaction data 426, verification module 136 may parse interaction data 426 to extract homomorphically encrypted spectrum data 424, which verification module 136 may route to a homomorphic NLP engine 428 of executed voice assistant engine 132. Upon execution, homomorphic NLP engine 428 may perform operations that apply one or more homomorphic NLP processes or algorithms to all or a selected portion of homomorphically encrypted spectrum data 424 (e.g., to the homomorphically encrypted MFCCs and additionally, or alternatively, to other homomorphically encrypted information characterizing the MFC of captured utterance 414).

Based on the application of the one or more homomorphic NLP processes or algorithms to the homomorphically encrypted MFCCs and additionally, or alternatively, to the other homomorphically encrypted information characterizing the MFC of captured utterance 414, homomorphic NLP engine 428 may generate and output a homomorphically encrypted command 430 representative of a content, meaning, or intent of captured utterance 414. Further, and based on the application of the one or more homomorphic NLP processes or algorithms to the homomorphically encrypted MFCCs and/or the other homomorphically encrypted information, executed homomorphic NLP engine 428 may also adaptively determine and output third-party data 432 that identifies a third-party computing system, such as third-party system 180, capable of decrypting homomorphically encrypted command 430 (e.g., using homomorphic private key 404), determining the content, meaning, or intent of captured utterance 414 based on now-decrypted homomorphically encrypted command 430 (e.g., based on an application of one or more of the homomorphic NLP processes or algorithms to the now-decrypted homomorphically encrypted command 430), and performing operations consistent with the determined content, meaning, or intent. In some instances, third-party data 432 may include a unique network address of the identified third-party computing system, such as an IP address of third-party system 180.

As described herein, captured utterance 414 may correspond to a request, by user 101, for the current balance of the checking account (e.g., "What's the balance of my checking account"). In some instances, and based on the application of the one or more homomorphic NLP processes or algorithms to the homomorphically encrypted MFCCs and/or the other homomorphically encrypted information, executed homomorphic NLP engine 428 may: (i) generate homomorphically encrypted textual data representative of the request by user 101 for the checking-account balance (e.g., based on the fully homomorphic properties of the homomorphic encryption scheme associated with homomorphic private key 404 and homomorphic public key 406), and package the homomorphically encrypted textual data into corresponding portions of homomorphically encrypted command 430; and (ii) generate third-party data 432 that identifies third-party system 180 (e.g., an IP address, etc.) as the third-party computing system capable of decrypting and processing homomorphically encrypted command 430. In some instances, the homomorphically encrypted textual data may include one or more discrete, homomorphically encrypted elements of text that, when decrypted by third-party system 180 using homomorphic private key 404, collectively represent the request by user 101 for the checking-account balance.

In other instances, the homomorphically encrypted command 430 may include all, or a selected portion, of the homomorphically encrypted MFCCs and/or the other homomorphically encrypted information characterizing captured utterance 414 (e.g., as specified within homomorphically encrypted spectrum data 424), either alone or in combination with additional elements of the homomorphically encrypted textual data described herein. The disclosed embodiments are, however, not limited to these examples of homomorphically encrypted command 430, and in other instances, executed homomorphic NLP engine 428 may generate a homomorphically encrypted command that includes any additional or alternate elements of homomorphically encrypted data that, when decrypted and processed by third-party system 180, enable third-party system 180 to perform operations consistent with captured utterance 414, e.g., the request for the checking-account balance by user 101.

Examples of these homomorphic NLP processes or algorithms may include one or more machine learning processes, such as, but not limited to, a clustering algorithm or unsupervised learning algorithm (e.g., a k-means algorithm, a mixture model, a hierarchical clustering algorithm, etc.), a semi-supervised learning algorithm, or a decision-tree algorithm. In other examples, the homomorphic NLP processes or algorithms may also include one or more artificial intelligence models, such as, but not limited to, an artificial neural network model, a recurrent neural network model, a Bayesian network model, or a Markov model. Further, the homomorphic NLP processes or algorithms may also include one or more statistical processes, such as those that make probabilistic decisions based on attaching real-valued weights to elements of certain input data.

In some instances, each of the homomorphic NLP processes or algorithms may be trained against, and improved using, selected elements of homomorphically encrypted training data, and as such, may operate on and process selected elements of homomorphically encrypted input data. In some instances, the elements of homomorphically encrypted training data may be locally maintained by provider system 130 (and others of the computing systems associated with the provider of the cloud-based services) within one or more tangible, non-transitory memories, e.g., as homomorphically encrypted training data 434 maintained within training database 436 (e.g., within the one or more tangible, non-transitory memories of provider system 130). By way of example, the elements of homomorphically encrypted training data 434 may include, but are not limited to: (i) homomorphically encrypted MFCCs and/or other homomorphically encrypted information characterizing MFCs of audio content associated with prior interactions between the programmatic established virtual assistants described herein and users of voice-enabled devices within environment 100; and (ii) one or more homomorphically encrypted commands generated by executed homomorphic NLP engine 428 through on the application of the homomorphic NLP processes or algorithms to the homomorphically encrypted MFCCs and/or other homomorphically encrypted information.

Homomorphically encrypted training data 434 may also include elements of homomorphically encrypted outcome data characterizing the actual text of the captured utterances associated with each of the prior interactions (e.g., as generated by the corresponding ones of the third-party computing systems, such as third-party system 180). Further, although not illustrated in FIG. 4A, training database 436 may also include elements of third-party data generated by executed homomorphic NLP engine 428 for one or more of the prior interactions, and additional outcome data indicative of an actual capability of corresponding ones of the third-party computing systems to decrypted and process the homomorphically encrypted commands.

By way of example, a corresponding one of the homomorphic NLP processes or algorithms described herein may be deemed trained when an accuracy of the homomorphically encrypted commands generated by homomorphic NLP engine 428 satisfies a first predetermined metric (e.g., that at least a threshold number of the elements of homomorphically encrypted textual data associated with the homomorphically encrypted commands match corresponding elements of the homomorphically encrypted outcome data described herein, etc.). In additional, or alternative, instances, the corresponding one of the homomorphic NLP processes or algorithms described herein may also be deemed trained when an accuracy of the third-party data generated by executed homomorphic NLP engine 428 satisfies a second predetermined metric (e.g., that at least a threshold number of the identified third-party computing systems are capable of decrypting and processing corresponding ones of the homomorphically encrypted commands, as specified within the additional outcome data described herein, etc.).

Homomorphic NLP engine 428 may perform additional operations that package homomorphically encrypted command 430 into a corresponding portion of third-party command data 438, along with all, or a selected portion, of credential data 118 (e.g., the authentication credential of user 101, the IP or MAC address of client device 102, the application-specific cryptogram or digital token associated with executed voice assistant application 104). Further, although not illustrated in FIG. 4A, homomorphic NLP engine 428 may also package, within a corresponding portion of third-party command data 438, information that uniquely identifies provider system 130 or executed voice assistant engine 132, such as, but not limited to, a corresponding network address (e.g., an IP address) or a cryptogram or digital token associated with executed voice assistant engine 132 (e.g., an OAuth token). In some instances, homomorphic NLP engine 428 may generate and apply a digital signature 440 to third-party command data 438, e.g., based on a private cryptographic key associated with provider system 130 or with executed voice assistant engine 132. Homomorphic NLP engine 428 may perform operations that cause provider system 130 to transmit third-party command data 438, applied digital signature 440 and a public key certificate 154 of provider system 130 or executed voice assistant engine 132 (e.g., that include a corresponding public cryptographic key of provider system 130 or executed voice assistant engine 132), across network 120 to the network address of the third-party specified within third-party data 432, e.g., the IP address of third-party system 180.

Referring to FIG. 4B, a programmatic interface established and maintained by third-party system 180, e.g., API 182, may receive and route third-party command data 438 (and in some instances, applied digital signature 440 and public key certificate 154 of provider system 130) to query verification module 184 of third-party system 180. By way of example, and when executed by the one or more processors of third-party system 180, query verification module 184 may parse public key certificate 154 to obtain the public cryptographic key of provider system 130 or executed voice assistant engine 132, and may perform operations that validate applied digital signature 440 based on the obtained public cryptographic key. Further, although not illustrated in FIG. 4B, executed query verification module 184 may also parse third-party command data 438 to obtain the information that uniquely identifies provider system 130 or executed voice assistant engine 132, and may perform any of the processes described herein to verify an identity of provider system 130 or executed voice assistant engine 132 based on the obtained information.

In some instances, if executed query verification module 184 were unable to validate the applied digital signature, or were unable to verify the identity of provider system 130 or executed voice assistant engine 132, third-party system 180 may decline to respond to third-party command data 438. Query verification module 184 may perform further operations (not illustrated in FIG. 4B) that discard third-party command data 438, that generate an error message indicative of a failed verification of third-party command data 438, and further, that cause third-party system 180 to transmit the error message across network 120 to provider system 130.

Alternatively, if executed query verification module 184 were to validate the applied digital signature, and to verify successfully the identity of provider system 130 or executed voice assistant engine 132, executed query verification module 184 may perform operations that store third-party command data 438 within a corresponding portion of the one or more tangible, non-transitory memories of third-party system 180. Executed query verification module 184 may also parse third-party command data 438 to extract homomorphically encrypted command 430, which may be provided as an input to a decryption module 444 of third-party system 180. Upon execution by the one or more processors of third-party system 180, decryption module 444 may access cryptographic library 402, obtain homomorphic private key 404, and decrypt homomorphically encrypted command 430 using homomorphic private key 404, e.g., to generate a decrypted command 446. In some instances, executed decryption module 444 may provide decrypted command 446 as an input to a context determination engine 448 of third-party system 180, which when executed by the one or more processors of third-party system 180, perform any of the exemplary processes described herein to determine a content, meaning, or intent of captured utterance 414 based on decrypted command 446, and to generate contextual information 450 indicative of the determined content, meaning, or intent.

For example, and as described herein, homomorphically encrypted command 430 may include discrete, homomorphically encrypted elements of text representative of the request by user 101 for the checking-account balance, e.g., as specified within captured utterance 414. Upon decryption of homomorphically encrypted command 430 by executed decryption module 444 (e.g., using homomorphic private key 404), context determination engine 448 may receive decrypted command 446 that include decrypted text 456 representative of the request by user 101 for the checking-account balance (e.g., plain text that includes "what's the balance of my checking account"). In some instances, executed context determination engine 448 may perform operations that apply one or more of the adaptive NLP processes or algorithms described herein (e.g., as trained against, and adaptive improved using, unencrypted elements of training data) to decrypted text 456, and based on the application of the one or more adaptive NLP processes or algorithms to decrypted text 456, context determination engine 448 may identify one or more operations that respond to, and satisfy, captured utterance 414 of user 101.

As described herein, examples of these adaptive NLP processes or algorithms may include one or more machine learning processes, such as, but not limited to, a clustering algorithm or unsupervised learning algorithm (e.g., a k-means algorithm, a mixture model, a hierarchical clustering algorithm, etc.), a semi-supervised learning algorithm, or a decision-tree algorithm. In other examples, the adaptive NLP processes or algorithms may also include one or more artificial intelligence models, such as, but not limited to, an artificial neural network model, a recurrent neural network model, a Bayesian network model, or a Markov model. Further, the adaptive NLP processes or algorithms may also include one or more statistical processes, such as those that make probabilistic decisions based on attaching real-valued weights to elements of certain input data.

In some instances, each of the adaptive NLP processes or algorithms may be adaptively trained against, and improved using, selected elements of unencrypted training data 452, which may be locally maintained by third-party system 180 within training database 454, e.g., within one or more tangible, non-transitory memories. By way of example, the elements of the training data may include, but are not limited to: (i) elements of prior interaction data characterizing prior interactions between the programmatically established virtual assistants described herein and users of voice-enabled devices operating within environment 100; and (ii) elements of prior outcome data identifying and characterizing an outcome associated with each of these prior interactions, such as actual textual content associated with utterances captured by the voice-enabled devices during each of these prior interactions and one or more services provided, or operations performed, responsive to underlying queries specified by the actual textual content.

Referring back to FIG. 4B, decrypted text 456 may be representative of captured utterance 414 (e.g., "What's the balance of my checking account?"). Based on the application of certain of the exemplary NLP processes or algorithms described herein to decrypted text 456, context determination engine 448 may identify discrete linguistic elements (e.g., discrete words, etc.) that include, but are not limited to, "what," "is," "the," "balance," "of," "my," "checking," and "account." Context determination engine 448 may perform further operations that package all or a portion of the discrete linguistic elements into corresponding portions of structured input data (e.g., individually or in ordered combinations), and based on an application of the exemplary adaptive NLP processes or algorithms described herein to the structured input data, context determination engine 448 may determine that captured utterance 414 corresponds to a balance inquiry involving the checking account held by user 101. In some instances, context determination engine 448 may package information that identifies and characterizes the balance inquiry involving the checking account issued to user 101 into corresponding portions of contextual information 450, and may provide contextual information 450 and decrypted text 456 and inputs to data retrieval module 186 of third-party system 180.

In other examples, homomorphically encrypted command 430 may include all, or a selected portion, of the homomorphically encrypted MFCCs and/or the other homomorphically encrypted information characterizing captured utterance 414 (e.g., as specified within homomorphically encrypted spectrum data 424), and upon decryption by executed decryption module 444, decrypted command 446 may include corresponding decrypted MFCCs or other acoustic information characterizing captured utterance 414. Although not illustrated in FIG. 4B, context determination engine 448 may perform additional operations that, based on an application of one or more of the exemplary NLP processes or algorithms described herein to the decrypted MFCCs or other acoustic information, generate textual content, e.g., decrypted text 456, representative of captured utterance 414 (e.g., "What's the balance of my checking account?"), which context determination engine 448 may further process using any of the exemplary processes described herein, e.g., to determine the meaning or intent of captured utterance 414.

Referring back to FIG. 4B, and upon execution by the one or more processors of third-party system 180, data retrieval module 186 may receive contextual information 450 and decrypted text 456, and based on portion of contextual information 450, data retrieval module 186 may establish that captured utterance 414 represents a balance inquiry involving a checking account issued to user 101, and based on portions of credential data 118 (e.g., the authentication credential of user 101, the IP address of client device 102, etc.), executed data retrieval module 186 may access one or more data records 458 within confidential data store 181 that are associated with the checking account of user 101, and may perform operations that extract data 460 identifying the current balance associated with that credit card account (e.g., $5,450.00). In other examples, executed data retrieval module 186 may perform operations that compute the current balance of the credit card account based on elements of transaction or payment data maintained within data records 458, and may package the computed balance into balance data 460.

In some instances, executed data retrieval module 186 may provide balance data 460, credential data 118, and all, or selected portions, of contextual information 450 and decrypted text 456 as inputs to response generation engine 192 of third-party system 180. When executed by the one or more processors of third-party system 180, response generation engine 192 may perform any of the exemplary processes described herein to generate sequentially ordered elements of textual response data 462 that collectively represent a response to captured utterance 414, e.g., the request, by user 101, for the balance of the checking account.

As described herein, the sequentially ordered elements of textual response data 462 may include one or more elements of text (e.g., "insensitive" elements of text) that neither specify, reference, or implicate any of the sensitive profile, account, or transaction data maintained on behalf of user 101 by third-party system 180, and one or more additional elements of text (e.g., "sensitive" elements of text) that include selected portions of the sensitive profile, account, or transaction data that associated with the query specified within captured utterance 414, such as the $5,450.00 balance of the credit card account specified within balance data 460. In some instances, the sensitive elements may be disposed among, or sandwiched between, certain of the insensitive elements within the sequentially ordered elements of textual response data 194, and when concerted to the corresponding elements of synthesized speech, represent a natural-language response to captured utterance 112 within the ongoing and simulated conversation between user 101 and the virtual assistant programmatically established at client device 102 by executed voice assistant application 104.

Referring to FIG. 4C executed response generation engine 192 may perform operations that generate the sequentially ordered elements of textual response data 462, including the sensitive and insensitive elements described herein, in accordance with one or more response templates and additionally, or alternatively, in accordance with one or more predetermined rules that specify appropriate responses. For example, each of response templates or predetermined rules may be associated with a particular inquiry type (e.g., a balance inquiry, a credit inquiry, etc.) or a particular inquiry subject (e.g., an investment account, a credit card account, etc.), and third-party system 180 may maintain data identifying and specifying each of the response templates or predetermined rules within a corresponding portion of the one or more tangible, non-transitory memories, e.g., within template and rules data store 183.

Upon receipt of balance data 460, credential data 118, and all, or the selected portions, of contextual information 450 and decrypted text 456, element population module 196 of executed response generation module 192 may parse contextual information 450 to determine the corresponding inquiry type (e.g., the balance inquiry) or the corresponding inquiry subject (e.g., the checking account held by user 101). Further, element population module 196 may access may access template and rules data store 183 and extract template data 464 that specifies a response template consistent with the corresponding balance inquiry and credit card account. In some instances, the response template within template data 464 may specify may include, but is not limited to: (i) predetermined textual content that specifies one or more insensitive elements of text within textual response data 462; (ii) placeholder content that, once populated with corresponding elements of the confidential profile, account, or transaction data, establish one or more sensitive elements of text within textual response data 462; and (ii) sequence data that specifies an ordering of each of the insensitive and sensitive elements of text within textual response data 194.

As described herein, the response template may include a leading portion 466A of predetermined textual content (e.g., "The current balance of your checking account is"), placeholder content 466B associated with the current balance of the checking account (e.g., "$[[Current Balance]]."), and a trailing portion 466C of predetermined textual content (e.g., "How else can I help you?"). Further, sequence data 199D maintained within the response template may specify that placeholder content 466B should, when populated with the current balance of the checking account (e.g., $5,450.00, as specified within balance data 460), be disposed between leading portion 466A and trailing portion 466C of predetermined textual content within textual response data 464. The disclosed embodiments are, however, not limited to these exemplary elements of predetermined textual and placeholder content, and to the exemplary sequence of these elements of predetermined textual and placeholder content within textual response data 462, and in other instances, the response template may specify any additional or alternate elements of predetermined textual or placeholder content, disposed in any additional or alternate sequence, that would be appropriate to the response to the balance inquiry involving the credit card account issued by user 101.

In some instances, element population module 196 may parse template data 464 and access leading portion 466A of predetermined textual content and trailing portion 466C of predetermined textual content. Element population module 196 may generate a leading element 462A of textual response data 462 that includes leading portion 466A of predetermined textual content (e.g., "The current balance of your checking account is"), and may also generate a trailing element 462C of textual response data 462 that includes trailing portion 466C of predetermined textual content (e.g., "How else can I help you?"). Element population module 196 may parse further template data 464 and access placeholder content 466B, which includes a placeholder representative of the current balance of the checking account. In some examples, element population module 196 may also perform operations that generate a populated element 462B of textual response data 462 by populating, or replacing, the placeholder representative of the current balance of the checking account (e.g., [[Current Balance]]) with the corresponding value of the current balance (e.g., 5,450.00, as maintained within balance data 460).

In some exemplary embodiments, described herein, executed response generation module 192 may perform operations that package leading element 462A, populated element 462B, and trailing element 462C within textual response data 462 in accordance with sequence data 466D, and that provide textual response data 462 (e.g., plaintext "The current balance of your checking account is $5,450.00. How else can I help you?") as an input to an encryption module 468 of third-party system 180. When executed by the one or more processors of third-party system 180, encryption module 468 may access cryptographic library 402, obtain public cryptographic key 412 associated with client device 102 or executed voice assistant application 104, and encrypt textual response data 462 using public cryptographic key 412, e.g., to generate encrypted response data 470. In some instances, encryption module 468 may provide encrypted response data 470 to a routing module 471 of third-party system 180.

Upon execution, routing module 471 may perform operations that obtain unique network address 316 of client device 102 (e.g., from a corresponding portion of credential data 118, as maintained within the one or more tangible, non-transitory memories of third-party system 180), and may package network address 316 within a corresponding portion of encrypted response data 470. Further, routing module 471 may perform additional operations that cause third-party system 180 to transmit encrypted response data 470 across network 120 to one or more of the computing systems associated with the provider of the cloud-based services. By way of example, provider system 130 may receive encrypted response data 470 through a secure, programmatic interface, such as API 318, which may route encrypted response data 470 to executed voice assistant engine 132. In some instances, executed voice assistant engine 132 may parse encrypted response data 470 to identify network address 316 of client device 102 (e.g., an IP address, etc.), and may perform operations that cause provider system 130 to route encrypted response data 470 across network 120 to client device 102.

A programmatic interface established and maintained by client device 102, such as API 210, may receive encrypted response data 470, and may route encrypted response data 470 to decryption module 319 of executed voice assistant application 104. As illustrated in FIG. 4C, and upon execution by the one or more processors of client device 102 (e.g., based on programmatic commands generated by executed voice assistant application 104), decryption module 319 may access private cryptographic key 410 locally maintained within secure portion 408 of the one or more tangible, non-transitory memories of client device 102 (e.g., the hardware-based key manager or the secure enclave), and may perform operations that decrypt encrypted response data 470 using private cryptographic key 410, and that provide decrypted response data 472 as an input to a speech synthesis module 474 of executed voice assistant application 104. In some instances, speech synthesis module 474 may be integrated into, may represent a modular component of, or may be operative with executed voice assistant application 104.

Upon execution by the one or more processors of client device 102, speech synthesis module 474 may apply any one or more of the TTS processes or speech-synthesis processes described herein to the now-decrypted text within decrypted response data 472 (e.g., "The current balance of your checking account is $5,450.00. How else can I help you?"), and generate audio content 476 representative of the now-decrypted text. As illustrated in FIG. 4C, executed speech synthesis module 474 may route audio content 476 to speaker 106B, which may present audio content 476 as a verbal response 478 to captured utterance 414 (e.g., "The current balance of your checking account is $5,450.00. How else can I help you?") within the ongoing and simulated conversation between user 101 and the virtual assistant programmatically established by executed voice assistant application 104.

In other examples, not illustrated in FIGS. 4A-4C, executed voice assistant application 104 may perform operations that cause client device 102 to transmit audio content 476 across direct communications channel 122 to voice-enabled device 102A, e.g., the wireless smart speaker described herein. One or more application programs executed by voice-enabled device 102A, such as a local voice assistant application (not illustrated in FIG. 2), may receive audio content 476 through a corresponding programmatic interface, and may route audio content 476 to a speaker or other acoustic interface, which may present audio content 476 to user 101 in response to captured utterance 414. Executed voice assistant application 104 may perform similar operations to transmit audio content 476 to additional or alternate voice-enabled devices coupled communicatively to client device 102 within environment 100.

Figure 5A:
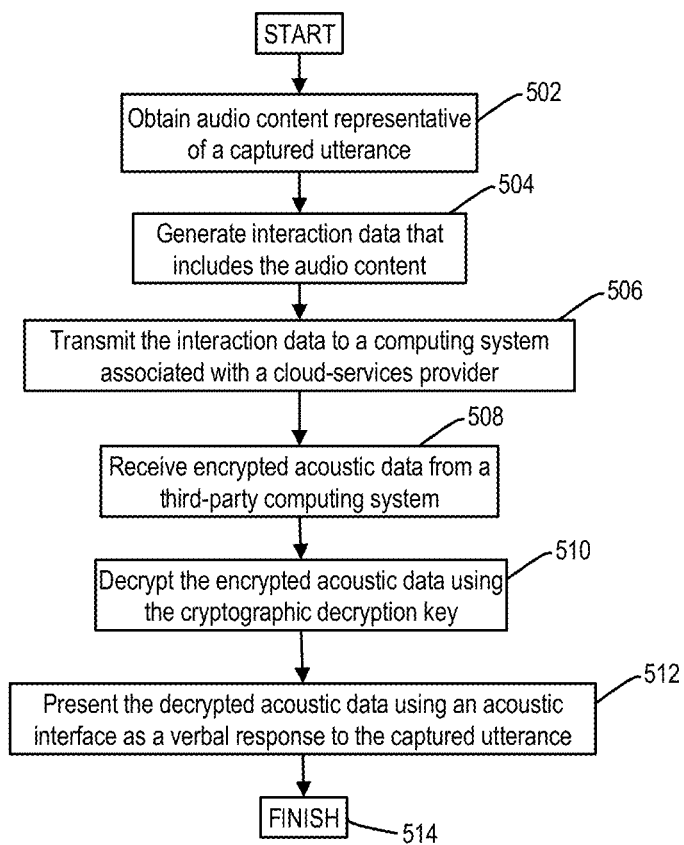
FIGS. 5A, 5B, 6A, and 6B are flowcharts of exemplary processes for maintaining confidentiality in communications involving voice-enabled devices operating within a distributed computing environment, in accordance with some exemplary embodiments.
Figure 5B:
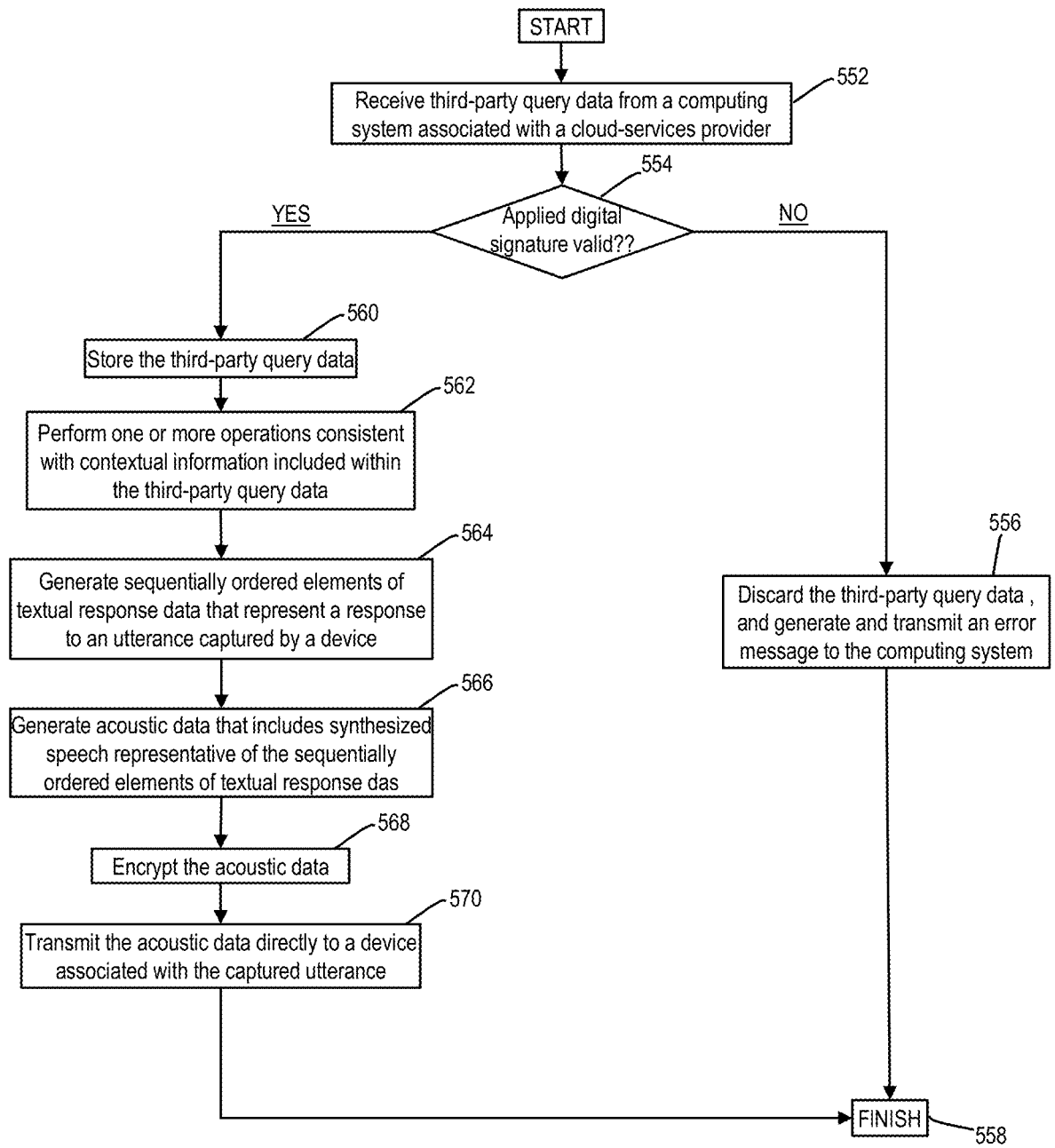

FIGS. 5A and 5B are flowcharts of exemplary processes for maintaining confidentiality in communications involving voice-enabled devices operating within a distributed computing environment, in accordance with the disclosed embodiments. In some examples, a voice-enabled device within a computing environment, such as client device 102 executing voice assistant application 104, may perform one or more of the exemplary steps of process 500, as described below in reference to FIG. 5A. Further, a computing system associated with a third-party computing system within the computing environment, such as third-party system 180, may perform one or more of the exemplary steps of process 550, as described below in reference to FIG. 5B.

Referring to FIG. 5A, client device 102 may obtain audio content representative of a captured utterance (e.g., in step 502). By way of example, and as described herein, client device 102 may execute a voice assistant application (e.g., voice assistant application 104), which may perform operations that initiate a simulated conversation between a user of client device 102, such as user 101, and a voice-based virtual assistant programmatically established by executed voice assistant application 104. In some instances, a microphone or other acoustic interface included within, or communicatively coupled to, client device 102 may capture an utterance of user 101 that requests one or more elements of sensitive data maintained at one or more third-party computing systems, such as third-party system 180. For example, the captured utterance may correspond to a request for a current balance of a credit card account or a checking account issued to user 101 by the financial institution associated with third-party system 180, and the microphone or other acoustic interface may generate one or more elements of audio content representative of the captured audience.

In some instances, client device 102 may perform any of the exemplary processes described herein to generate one or more elements of interaction data that include the audio content representative of the captured utterance (e.g., in step 504), and that transmit the generated elements of interaction data to one or more computing systems associated with a cloud-services provider, such as provider system 130 (e.g., in step 506). In some instances, the generated elements of interaction data may also include one or more elements of credential data that uniquely identify user 101, client device 102, or alternatively, executed voice assistant application 104. As described herein, examples of the credential data may include, but are not limited to, an authentication credential of user 101, a network address associated with client device 102 (e.g., an IP address or a MAC address), or an application-specific cryptogram, hash value, random number, or other element of cryptographic data that uniquely identifies executed voice assistant application 104. In other examples, the credential data may also include a digital token, e.g., an OAuth token, indicative of a successful outcome of a token-based authentication and consent protocol implemented between executed voice assistant application 104 and provider system 130.

As described herein, provider system 130 may receive the elements of interaction data, and may perform operations that verify of the interaction data, e.g., based on portions of the credential data described herein. Based on a successful verification of the credential data, provider system 130 may perform any of the exemplary processes described herein to compute spectrum data representative of a power spectrum of the audio content, and based on an application of one or more natural language processing (NLP) techniques to the portions of the spectrum data, convert the captured utterance into textual content and determine a meaning or an intent of the textual content and as such, of the captured utterance (e.g., a request for one or more sensitive elements of profile, account, or transaction data).

Further, and based on the determined meaning or intent, provider system 130 may perform additional of the exemplary processes described herein to identify one of the third-party computing systems configured to perform operations consistent with the determined meaning or intent (e.g., third-party system 180, which maintains the one or more sensitive elements of profile, account, or transaction data on behalf of user 101), and to generate third-party query data requesting a performance of the consistent operations (e.g., the retrieval of the requested elements of profile, account, or transaction data), and to transmit the third-party query data across network 120 to the third-party system 180. In some examples, described below in reference to FIG. 5B, third-party system 180 may perform any of the exemplary processes described herein to validate the third-party query data, to perform the requested operations (e.g., the retrieval of the requested elements of profile, account, or transaction data), to generate and transmit encrypted acoustic data representative of an output of the requested operations (e.g., the sensitive elements of profile, account, or transaction data) directly to client device 102, e.g., as an asynchronous response to the third-party query data.

Referring to FIG. 5B, third-party system 180 may receive third-party query data from a computing system associated with a cloud-services provider, such as provider system 130 (e.g., in step 552). As described herein, the third-party data query may include, among other things, textual data representative of an utterance of user 101 captured by a voice-enabled device, such as client device 102, during a simulated conversation with a programmatically generated virtual assistant, along with contextual information indicative of a determined meaning or intent of the captured utterance, each of which may be generated by provider system 130 based on an application of any of the exemplary adaptive NLP processes or algorithms or processes to audio content associated with that captured utterance. As described herein, the captured utterance may correspond to request, by user 101, to obtain one or more elements of sensitive profile, account, or transaction data maintained on behalf of user 101 by third-party system 180, and the contextual information may identify, among other things, the requested operation (e.g., a balance inquiry, etc.) and the one or more elements of sensitive profile, account, or transaction data.

In some instances, third-party query data may also include a digital signature applied by provider system 130, and third-party system 180 may perform any of the exemplary processes described herein to validate the applied digital signature (e.g., in step 554). If third-party system 180 were unable to validate the applied digital signature (e.g., step 554; NO), third-party system 180 may decline to respond to third-party query data 150. Third-party system 180 may perform operations that discard the third-party query data, and that generate that transmit an error message indicative of a failed validation of the third-party query data (e.g., in step 556). Exemplary process 550 is then complete in step 558.

Alternatively, if third-party system 180 were able to validate the applied digital signature (e.g., step 554; YES), third-party system 180 may store the third-party query data within one or more tangible, non-transitory memories (e.g., in step 560). In some instances, third-party system 180 may perform one or more operations consistent with the contextual information included within the third-party query data (e.g., in step 562). By way of example, and as described herein, the captured utterance may correspond to a request, by user 101, to obtain one or more elements of sensitive profile, account, or transaction data maintained on behalf of user 101 by third-party system 180 (e.g., a request for a balance of a credit card account, etc.). In step 562, third-party system 180 may parse the contextual information to identify the requested operation and the one or more elements of sensitive profile, account, or transaction data associated with the requested operation, and may perform the requested operation on the associated elements of sensitive profile, account, or transaction data.

By way of example, the contextual information may specify that user 101 requests a current balance of a checking account or a credit card account. Based on the contextual information, third-party system 180 may perform any of the exemplary processes described herein, within step 562, to access a confidential data store maintained within the one or tangible, non-transitory memories of third-party system 180, and may obtain the request balance of the checking account or a credit card account from data records of the confidential data store associated with user 101.

Third-party system 180 may also perform any of the exemplary processes described herein to generate sequentially ordered elements of textual response data that collectively represent a response to the captured utterance (e.g., in step 564). By way of example, the sequentially ordered elements of the textual response data may include one or more elements of text (e.g., "insensitive" elements of text) that neither specify, reference, or implicate any of the sensitive profile, account, or transaction data maintained on behalf of user 101 by third-party system 180, and one or more additional elements of text (e.g., "sensitive" elements of text) that include selected portions of the sensitive profile, account, or transaction data that associated with the requested by the captured utterance. By way of example, and as described herein, the captured utterance may correspond to a request for the balance of user 101's checking account or credit card account, and the sensitive elements of text may include the value of the current balance obtained by third-party system 180 from the confidential data store, as described herein.

Further, in step 566, third-party system 180 may perform any of the exemplary processes described herein to apply one or more text-to-speech (TTS) processes or speech-synthesis processes to all or a selected portion of the textual response data, and based application of these TTS or speech-synthesis processes to the portions of the textual response data, generate elements of acoustic data (e.g., synthesized speech) representative of the plain-text response to captured utterance. In some instances, third-party system may perform any of the exemplary processes described herein to encrypt the acoustic data using a corresponding cryptographic encryption key (e.g., in step 568), and to transmit the encrypted acoustic data to client device 102 (e.g., in step 570). In some instances, the encrypted acoustic data may represent an asynchronous response to the third-party query data that bypasses the computing systems associated with the cloud-services provider, including provider system 130, and may reduce a likelihood that entities unrelated to user 101 or the financial system that operates third-party system 180, such as the provider of the cloud-based services, may access, locally maintain, or distributed the elements of sensitive profile, account, or transaction data included within the encrypted acoustic data. Exemplary process 550 is then complete in step 558.

Referring back to FIG. 5A, client device 102 may receive the encrypted acoustic data from third-party system 180 through a corresponding programmatic interface (e.g., in step 508). Client device 102 may perform any of the exemplary processes described herein to access a corresponding cryptographic decryption key, and to decrypt the encrypted acoustic data using the cryptographic decryption key (e.g., in step 510). In some instances, an acoustic interface of client device 102, such as a speaker, may present the decrypted acoustic data as a verbal response to the captured utterance (e.g., in step 512). Exemplary process 500 is then complete in step 514.

Figure 6A:
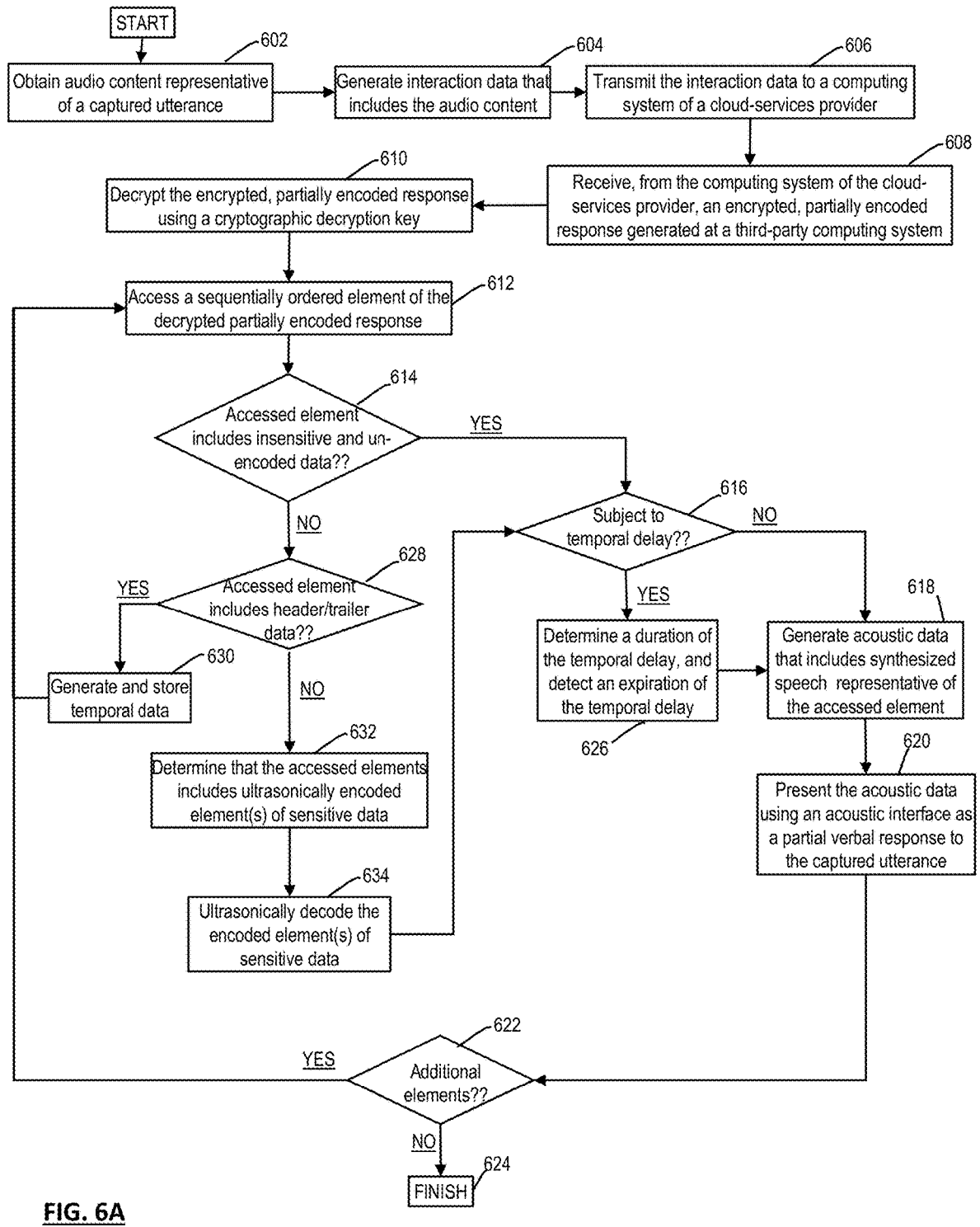
Figure 6B:
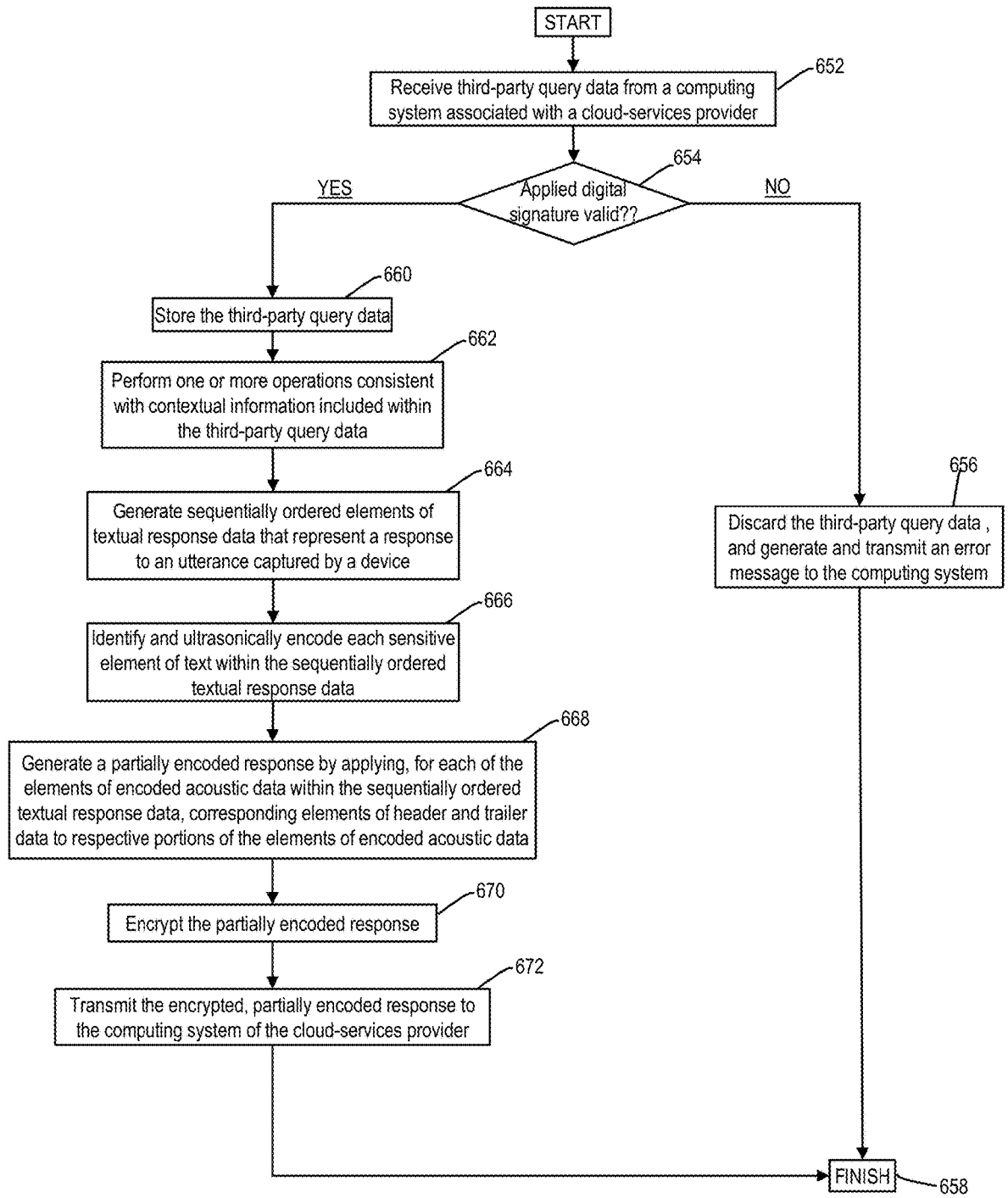

FIGS. 6A and 6B are flowcharts of exemplary processes for maintaining confidentiality in communications involving voice-enabled devices operating within a distributed computing environment, in accordance with the disclosed embodiments. In some examples, a voice-enabled device within a computing environment, such as client device 102 executing voice assistant application 104, may perform one or more of the exemplary steps of process 600, as described below in reference to FIG. 6A. Further, a computing system associated with a third-party computing system within the computing environment, such as third-party system 180, may perform one or more of the exemplary steps of process 650, as described below in reference to FIG. 6B.

Referring to FIG. 6A, client device 102 may obtain audio content representative of a captured utterance (e.g., in step 602). By way of example, and as described herein, client device 102 may execute a voice assistant application (e.g., voice assistant application 104), which may perform operations that initiate a simulated conversation between a user of client device 102, such as user 101, and a voice-based virtual assistant programmatically established by executed voice assistant application 104. In some instances, a microphone or other acoustic interface included within, or communicatively coupled to, client device 102 may capture an utterance of user 101 that requests one or more elements of sensitive data maintained at one or more third-party computing systems, such as third-party system 180. For example, the captured utterance may correspond to a request for a current balance of a credit card account or a checking account issued to user 101 by the financial institution associated with third-party system 180, and the microphone or other acoustic interface may generate one or more elements of audio content representative of the captured audience.

In some instances, client device 102 may perform any of the exemplary processes described herein to generate one or more elements of interaction data that include the audio content representative of the captured utterance (e.g., in step 604), and that transmit the generated elements of interaction data to one or more computing systems associated with a cloud-services provider, such as provider system 130 (e.g., in step 606). In some instances, the generated elements of interaction data may also include one or more elements of credential data that uniquely identify user 101, client device 102, or alternatively, executed voice assistant application 104. As described herein, examples of the credential data may include, but are not limited to, an authentication credential of user 101, a network address associated with client device 102 (e.g., an Internet Protocol (IP) address or a media access control (MAC) address), or an application-specific cryptogram, hash value, random number, or other element of cryptographic data that uniquely identifies executed voice assistant application 104. In other examples, the credential data may also include a digital token, e.g., an OAuth token, indicative of a successful outcome of a token-based authentication and consent protocol implemented between executed voice assistant application 104 and provider system 130.

As described herein, provider system 130 may receive the elements of interaction data, and may perform operations that verify of the interaction data, e.g., based on portions of the credential data described herein. Based on a successful verification of the credential data, provider system 130 may perform any of the exemplary processes described herein to compute spectrum data representative of a power spectrum of the audio content, and based on an application of one or more of the adaptive NLP processes or algorithms to the portions of the spectrum data, convert the captured utterance into textual content and determine a meaning or an intent of the textual content and as such, of the captured utterance (e.g., a request for the current balance of user 101's credit card account).

Further, and based on the determined meaning or intent, provider system 130 may perform additional of the exemplary processes described herein to identify one of the third-party computing systems configured to perform operations consistent with the determined meaning or intent (e.g., third-party system 180, which maintains sensitive elements of profile, account, or transaction data on behalf of user 101), and to generate third-party query data requesting a performance of the consistent operations (e.g., the retrieval of one or more requested elements of sensitive profile, account, or transaction data), and to transmit the third-party query data across network 120 to the third-party system 180. In some examples, described below in reference to FIG. 6B, third-party system 180 may perform any of the exemplary processes described herein to validate the third-party query data, to perform the requested operations (e.g., the retrieval of the requested elements of sensitive profile, account, or transaction data), to generate encrypted, and partially encoded acoustic data representative of an output of the requested operations directly to client device 102 via provider system 130, e.g., an encrypted and partially encoded synchronous response to the third-party query data.

Referring to FIG. 6B third-party system 180 may receive third-party query data from a computing system associated with a cloud-services provider, such as provider system 130 (e.g., in step 652). As described herein, the third-party data query may include, among other things, textual data representative of an utterance of user 101 captured by a voice-enabled device, such as client device 102, during a simulated conversation with a programmatically generated virtual assistant, along with contextual information indicative of a determined meaning or intent of the captured utterance, each of which may be generated by provider system 130 based on an application of any of the exemplary NLP processes or algorithms or processes to audio content associated with that captured utterance. As described herein, the captured utterance may correspond to request, by user 101, to obtain one or more elements of sensitive profile, account, or transaction data maintained on behalf of user 101 by third-party system 180, and the contextual information may identify, among other things, the requested operation (e.g., a balance inquiry, etc.) and the one or more elements of sensitive profile, account, or transaction data.

In some instances, third-party query data may also include a digital signature applied by provider system 130, and third-party system 180 may perform any of the exemplary processes described herein to validate the applied digital signature (e.g., in step 654). If third-party system 180 were unable to validate the applied digital signature (e.g., step 654; NO), third-party system 180 may decline to respond to third-party query data. Third-party system 180 may perform operations that discard the third-party query data, and that generate that transmit an error message indicative of a failed validation of the third-party query data (e.g., in step 656). Exemplary process 650 is then complete in step 658.

Alternatively, if third-party system 180 were able to validate the applied digital signature (e.g., step 654; YES), third-party system 180 may store the third-party query data within one or more tangible, non-transitory memories (e.g., in step 660). In some instances, third-party system 180 may perform one or more operations consistent with the contextual information included within the third-party query data (e.g., in step 662). By way of example, and as described herein, the captured utterance may correspond to a request, by user 101, to obtain one or more elements of sensitive profile, account, or transaction data maintained on behalf of user 101 by third-party system 180 (e.g., a request for a balance of a credit card account, etc.). In step 662, third-party system 180 may parse the contextual information to identify the requested operation and the one or more elements of sensitive profile, account, or transaction data associated with the requested operation, and may perform the requested operation on the associated elements of sensitive profile, account, or transaction data.

By way of example, the contextual information may specify that user 101 requests a current balance of a checking account or a credit card account. Based on the contextual information, third-party system 180 may perform any of the exemplary processes described herein, within step 662, to access a confidential data store maintained within the one or tangible, non-transitory memories of third-party system 180, and may obtain the request balance of the checking account or a credit card account from data records of the confidential data store associated with user 101.

Third-party system 180 may also perform any of the exemplary processes described herein to generate sequentially ordered elements of textual response data that collectively represent a response to captured utterance (e.g., in step 664). By way of example, the sequentially ordered elements of the textual response data may include one or more elements of text (e.g., "insensitive" elements of text) that neither specify, reference, or implicate any of the sensitive profile, account, or transaction data maintained on behalf of user 101 by third-party system 180, and one or more additional elements of text (e.g., "sensitive" elements of text) that include selected portions of the sensitive profile, account, or transaction data that associated with the requested by the captured utterance. By way of example, and as described herein, the captured utterance may correspond to a request for the balance of user 101's checking account or credit card account, and the sensitive elements of text may include the value of the current balance obtained by third-party system 180 from the confidential data store, as described herein.

In some instances, third-party system 180 may perform operations that identify and ultrasonically encode each of the sensitive elements of text within the sequentially ordered textual response data (e.g., in step 666). For example, in step 666, third-party system 180 may identify and access the sensitive element of text associated with the current balance of user 101's checking account or credit card account, and may apply any of the exemplary ultrasonic encoding protocols described herein to the accessed sensitive element of text to generate a corresponding element of encoded acoustic data. Examples of these ultrasonic encoding protocols include, but are not limited to, to a LISNR™ encoding protocol or a ToneTag™ encoding protocol, and third-party system 180 may perform similar operations, in step 666, to identify and access each additional, or alternate, sensitive element of text within the sequentially ordered textual response data, and to ultrasonically encode each additional, or alternate, sensitive element of text to generate a corresponding elements of encoded acoustic data.

Third-party system 180 may also perform operations that, for each of the elements of encoded acoustic data within the sequentially ordered textual response data, apply corresponding elements of header and trailer data to respective leading and trailing portions of the elements of encoded acoustic data (e.g., in step 668). For example, encoded acoustic elements representative of the current balance of user 101's checking account or credit card account may be disposed between a corresponding element of header data and a corresponding element of trailer data. In some instances, each element of header data may be indicative of a first predetermined delay between a presentation of synthesized speech representative of immediately preceding and succeeding elements of sequentially ordered textual response data, and similarly, each element of trailer data may be indicative of a second predetermined delay between a presentation of synthesized speech representative of immediately preceding and succeeding elements of sequentially ordered textual response data. Exemplary durations of the first and second predetermined delays may include, but are not limited to, one second, three seconds, or five seconds, and in some examples, the first predetermined duration may be equivalent to the second predetermined duration.

In some instances, the sequentially ordered textual response data, which includes one or more elements of encoded acoustic data representative of respective ones of the sensitive elements of text and associated with corresponding elements of header and trailer data, may represent a partially encoded response to the third-party query data. Third-party system 180 may perform operations that encrypt the partially encoded response using a corresponding cryptographic encryption key (e.g., in step 670), and that transmit the encrypted, partially encoded response to provider system 130 which may perform any of the exemplary processes described herein to route the encrypted, partially encoded response to client device 102 (e.g., in step 672). In some instances, the encrypted, partially encoded response may correspond to synchronous response to the third-party query data that passes through the computing systems associated with the cloud-services provider, including provider system 130, and while reducing the likelihood that entities unrelated to user 101 or the financial system that operates third-party system 180, such as the provider of the cloud-based services, may access, locally maintain, or distributed the elements of sensitive profile, account, or transaction data included within the encrypted acoustic data. Exemplary process 650 is then complete in step 658.

Referring back to FIG. 6A, client device 102 may receive, from provider system 130, the encrypted, partially encoded response generated by third-party system 180 through a corresponding programmatic interface (e.g., in step 608). Client device 102 may perform any of the exemplary processes described herein to access a corresponding cryptographic decryption key, and to decrypt the encrypted, partially encoded response acoustic data using the cryptographic decryption key (e.g., in step 610).

In some instances, client device 102 may access a sequentially ordered element of the now-decrypted partially encoded response (e.g., in step 612), and determine whether the accessed element includes un-encoded and insensitive and text (e.g., in step 614). If client device 102 were to determine that accessed element includes insensitive and un-encoded text (e.g., step 614; YES), client device 102 may perform any of the exemplary processes described herein to determine whether an audible presentation of the insensitive and un-encoded text is subject to a temporal delay, such as a predetermined temporal delay associated with an immediately preceding element of header or trailer data (e.g., in step 616).

For example, if client device 102 were to determine that the presentation of the un-encoded and insensitive text is not subject to a temporal delay (step 616; NO), client device 102 may perform any of the exemplary processes described herein to apply one or more text-to-speech (TTS) processes or speech-synthesis processes to all or a selected portion of the text included within the accessed element, and based application of these TTS or speech-synthesis processes, generate elements of acoustic data (e.g., synthesized speech) representative of the text included within the accessed element (e.g., in step 618). In some instances, an acoustic interface of client device 102, such as a speaker, may present the generated elements of acoustic data as a partial verbal response to the captured utterance (e.g., in step 620), and client device 102 may perform any of the exemplary processes described herein to establish whether additional ones of the sequentially ordered elements of the partially encoded response await analysis and presentation (e.g., in step 622).

In one instance, if client device 102 were to establish that no additional ones of the sequentially ordered elements of the partially encoded response await analysis and presentation (e.g., step 622; NO), exemplary process 600 is then complete in step 624. Alternatively, if client device 102 were to establish that further ones of the sequentially ordered elements of the partially encoded response await analysis and presentation (e.g., step 622; YES), exemplary process 600 may pass back to step 612, and client device 102 may access another element of the partially encoded response.

Referring back to step 616, if client device 102 were to determine that the presentation of the insensitive and un-encoded text is subject to a temporal delay (step 616; YES), client device 102 may perform any of the exemplary processes described herein to determine a duration of that temporal delay based on stored elements of temporal data, and upon a detection of an expiration of that temporal delay by client device 102 (e.g., in step 626), exemplary process 600 may pass back to step 618, and client device 102 may perform any of the exemplary processes described herein to apply one or more TTS processes or speech-synthesis processes to all or a selected portion of the text included within the accessed element.

Referring back to step 614, if client device 102 were to determine that the accessed element fails to include unencoded and insensitive text (e.g., step 614; NO), client device 102 may perform any of the exemplary processes described herein to determine whether the accessed element represents an element of header or trailer data (e.g., in step 628). If, for example, client device 102 were to establish that the accessed element represents the element of header or trailer data (e.g., step 628; YES), client device 102 may perform any of the exemplary processes described herein to establish a duration of a corresponding temporal delay, and to generate and store temporal data indicative of the duration within one or more tangible, non-transitory memories of client device 102 (e.g., in step 630). Exemplary process 600 may then pass back to step 612, and client device 102 may access another element of the partially encoded response.

In other examples, if client device 102 were to establish that the accessed element does not represents the element of header or trailer data (e.g., step 628; NO), client device 102 may determine that the access element includes one or more ultrasonically encoded elements of sensitive profile, account, or transaction data, such as the balance of user 101's checking or credit card account (e.g., in step 632). Based on this determination, client device 102 may perform any of the exemplary processes described herein to decode the one or more ultrasonically encoded elements of sensitive profile, account, or transaction data (e.g., in step 634). Exemplary process 600 may pass back to step 616, and client device 102 may determine whether a presentation of the now-decoded elements of sensitive profile, account, or transaction data, e.g., as a partial verbal response to the captured utterance, is subject to a temporal delay (step 616; YES).

Figure 7A:
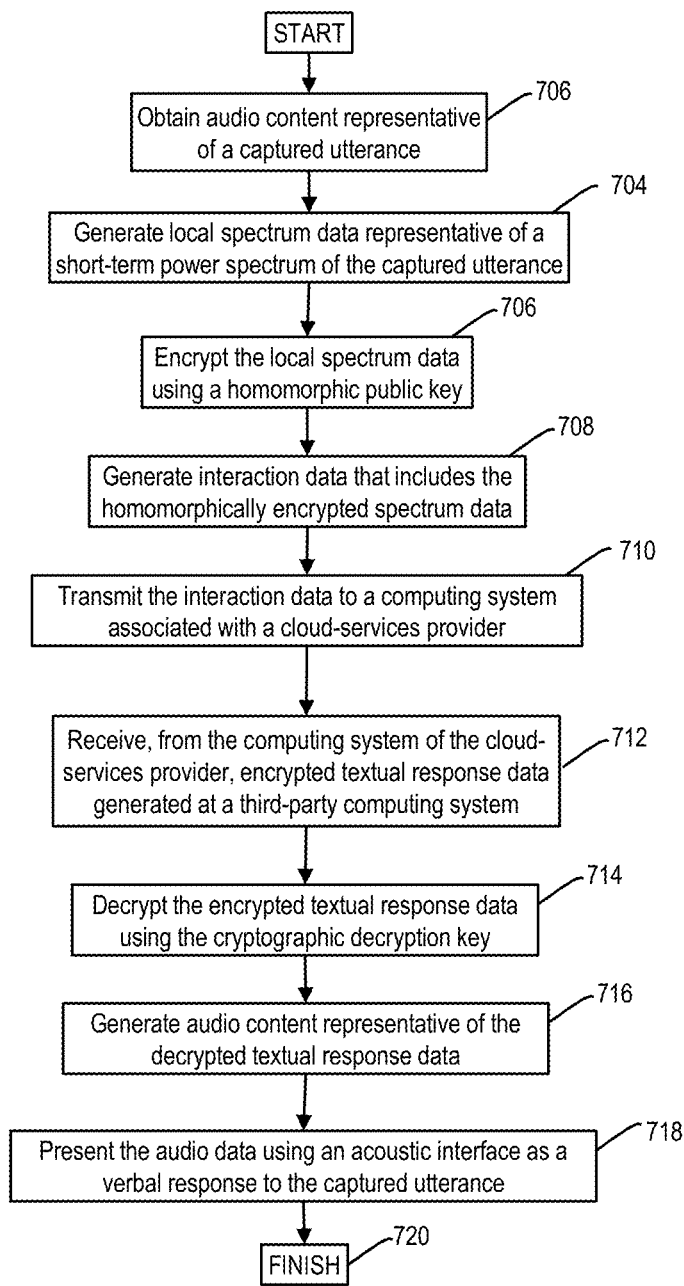
FIGS. 7A and 7B are flowcharts of exemplary processes for maintaining confidentiality in communications involving voice-enabled devices operating within a distributed computing environment using homomorphic encryption, in accordance with some exemplary embodiments.
Figure 7B:
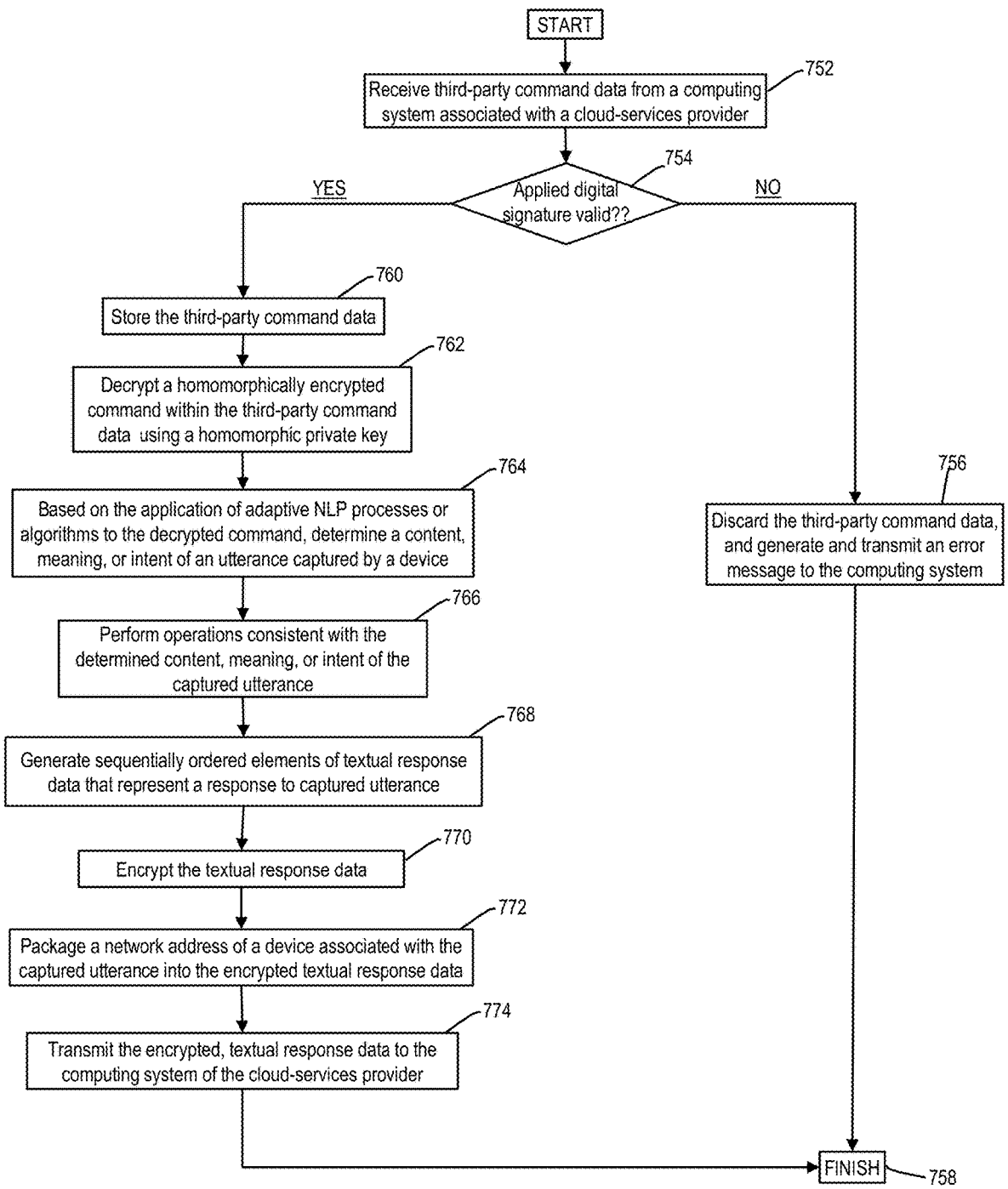

FIGS. 7A and 7B are flowcharts of exemplary processes for maintaining confidentiality in communications involving voice-enabled devices operating within a distributed computing environment using homomorphic encryption, in accordance with the disclosed embodiments. In some examples, a voice-enabled device within a computing environment, such as client device 102 executing voice assistant application 104, may perform one or more of the exemplary steps of process 700, as described below in reference to FIG. 7A. Further, a computing system associated with a third-party computing system within the computing environment, such as third-party system 180, may perform one or more of the exemplary steps of process 750, as described below in reference to FIG. 7B.

Referring to FIG. 7A, client device 102 may obtain audio content representative of a captured utterance (e.g., in step 702). By way of example, and as described herein, client device 102 may execute a voice assistant application (e.g., voice assistant application 104), which may perform operations that initiate a simulated conversation between a user of client device 102, such as user 101, and a voice-based virtual assistant programmatically established by executed voice assistant application 104. In some instances, a microphone or other acoustic interface included within, or communicatively coupled to, client device 102 may capture an utterance of user 101 that requests one or more elements of sensitive data maintained at one or more third-party computing systems, such as third-party system 180. For example, the captured utterance may correspond to a request for a current balance of a credit card account or a checking account issued to user 101 by the financial institution associated with third-party system 180, and the microphone or other acoustic interface may generate one or more elements of audio content representative of the captured audience.

Based on the audio content, client device 102 may perform any of the exemplary processes described herein to generate local spectrum data representative of a short-term power spectrum of the captured utterance (e.g., in step 704). In some instances, the representation of the short-term power spectrum of the captured utterance may correspond to a mel-frequency cepstrum (MFC) of the captured utterance, and the local spectrum data 420 may include mel-frequency cepstrum coefficients (MFCCs) that collectively establish the mel-frequency cepstrum (MFC). Client device 102 may, for instance, perform in step 704 any of the exemplary processes described herein (e.g., in reference to executed spectrum processing module 138 of provider system 130) to derive the MFCCs for the captured utterance and to package the derived MFCCs into corresponding portion of local the spectrum data.

Client device 102 may also perform any of the exemplary processes described herein to obtain a homomorphic public key associated with the client device or with the executed voice assistant application from a secure portion of one or more tangible, non-transitory memories (e.g., the hardware-based key manager or secure enclave), and to encrypt the local spectrum data using the homomorphic public key (e.g., in step 706). For example; in step 706, client device 102 may encrypt each of the MFCCs within the local spectrum data using the homomorphic public key, and may package each of the homomorphically encrypted MFCCs into a corresponding portion of homomorphically encrypted spectrum data.

In some instances, client device 102 may package the homomorphically encrypted spectrum data, which includes the homomorphically encrypted MFCCs representative of the obtained audio content (and as such, the captured utterance), into a corresponding portion of interaction data (e.g., in step 708). Further, in step 708, client device 102 may also package, into an additional portion of the interaction data, one or more elements of credential data that uniquely identify user 101, client device 102, or alternatively, the executed voice assistant application. Examples of credential data 118 may include, but are not limited to, an authentication credential of user 101, a network address associated with client device 102 (e.g., an IP address, etc.), or an application-specific cryptogram, digital token (e.g., the OAuth token described herein), hash value, random number, or other element of cryptographic data that uniquely identifies the executed voice assistant application. Client device 102 may perform operations that transmit the interaction data across network 120 to one of more of the computing systems associated with the provider of the cloud-based services, such as provider system 130 (e.g., in step 710).

As described herein, provider system 130 may receive the elements of interaction data, and may perform operations that verify an identity of user 101, client device 102, or the executed voice assistant application and as such, verify the interaction data, based on portions of the credential data described herein. Based on a successful verification of the interaction data (e.g., based on a comparison between one or more portions of the received credential data and corresponding portions of locally maintained reference data), provider system 130 may perform any of the exemplary processes described herein to apply one or more of the homomorphic NLP processes or algorithms described herein to input data that includes all, or a selected portion, of the homomorphically encrypted MFCCs representative of the obtained audio content (e.g., as maintained within the homomorphically encrypted spectrum data). In some instances, and as described herein, the one or more homomorphic NLP processes or algorithms may be adaptively trained, and improved using selected elements of homomorphically encrypted training data, and once deemed trained, these homomorphic NLP processes or algorithms may accept, and operate upon, homomorphically encrypted input data that includes, but is not limited to, the homomorphically encrypted MFCCs or other elements of homomorphically encrypted data characterizing the obtained audio content and as such, the captured utterance.

Based on the application of the one or more homomorphic NLP processes or algorithms to the elements of homomorphically encrypted input data (e.g., the homomorphically encrypted MFCCs, etc.), provider system 130 may perform any of the exemplary processes described herein to generate homomorphically encrypted command data that represents a content, meaning, or intent of the audio data and as such, of the captured utterance. Further, and based on the application of the one or more NLP processes or algorithms to the elements of homomorphically encrypted input data, provider system 130 may perform additional ones of the exemplary processes described herein identify a third-party computing system, such as third-party system 180, capable of decrypting the homomorphically encrypted command, determining the content, meaning, or intent of the captured utterance based on decrypted command, and perform operations consistent with the determined content, meaning, or intent. As described herein, provider system 130 may perform any of the exemplary processes described herein to generate and apply a digital signature to the homomorphically encrypted command, and to transmit third-party command data that includes the homomorphically encrypted command, the applied digital signature, and a public key certificate of provider system 130 (e.g., that includes a public cryptographic key of provider system 130) across network 120 to the identified third-party computing system, such as third-party system 180.

Referring to FIG. 7B, third-party system 180 may receive the third-party command data, which includes the homomorphically encrypted command, the applied digital signature, and the public key certificate, from provider system 130 across network 120 (e.g., in step 752). In some instances, third-party system 180 may perform any of the exemplary processes described herein to validate the applied digital signature based on the public cryptographic key maintained within the public key certificate (e.g., in step 754). If third-party system 180 were unable to validate the applied digital signature (e.g., step 754; NO), third-party system 180 may decline to respond to the third-party command data 438. Third-party system 180 may perform further operations that discard the third-party command data, that generate and transmit an error message indicative of a failed verification across network 120 to provider system 130 (e.g., in step 756). Exemplary process 750 is then complete in step 758.

Alternatively, if third-party system 180 were to validate the applied digital signature (e.g., step 754; YES), third-party system 180 may perform operations that store the third-party command data within one or more tangible, non-transitory memories of third-party system 180 (e.g., in step 760). Third-party system 180 may also parse the third-party command data to extract the homomorphically encrypted command 430, and may perform any of the exemplary processed described herein to decrypt the homomorphically encrypted command using a locally accessible homomorphic private key and to generate a decrypted command (e.g., in step 762).

Third-party system 180 may also perform any of the exemplary processes described herein to apply one or more of the adaptive NLP processes or algorithms described herein to the decrypted command, and based on the application of these adaptive NLP processes or algorithms, third-party system 180 may perform any of the exemplary processes described herein to determine a content, meaning, or intent of the captured utterance based on the decrypted command (e.g., in step 764). As described herein, the one or more adaptive NLP processes or algorithms may be trained against, and adaptively improved using, one or more elements of unencrypted training data, and examples of the unencrypted training data include, but are not limited to: (i) elements of prior interaction data characterizing prior interactions between the programmatically established virtual assistants described herein and users of voice-enabled devices operating within environment 100; and (ii) elements of prior outcome data identifying and characterizing an outcome associated with each of these prior interactions, such as actual textual content associated with utterances captured by the voice-enabled devices during each of these prior interactions and one or more services provided, or operations performed, responsive to underlying queries specified by the actual textual content.

Based on the determined content, meaning, or intent of the decrypted command, third-party system 180 may perform any of the exemplary processes described herein to perform one or more operations consistent with the determined content, meaning, or intent of the captured utterance (e.g., in step 766). For example, and based on the application of the one or more NLP processes or algorithms to the decrypted command (e.g., in step 764), third-party system 180 may determine the user 101 requested one or more elements of sensitive profile, account, or transaction data maintained at third-party system 180 on behalf of user 101. In some instances, in step 766, third-party system 180 may perform any of the exemplary processes described herein to access the one or more tangible, non-transitory memories, which maintain the sensitive profile, account, or transaction data within corresponding data stores, and may obtain the one or more requested data elements form the corresponding data stores.

Third-party system 180 may also perform any of the exemplary processes described herein to generate sequentially ordered elements of textual response data that collectively represent a response to captured utterance (e.g., in step 768). By way of example, the sequentially ordered elements of the textual response data may include one or more elements of text (e.g., "insensitive" elements of text) that neither specify, reference, or implicate any of the sensitive profile, account, or transaction data maintained on behalf of user 101 by third-party system 180, and one or more additional elements of text (e.g., "sensitive" elements of text) that include the one or more requested elements of the sensitive profile, account, or transaction data specified within the captured utterance. By way of example, and as described herein, the captured utterance may correspond to a request for the balance of user 101's checking account or credit card account, and the sensitive elements of text may include the value of the current balance obtained by third-party system 180 from the confidential data store, as described herein.

In some instances, third-party system 180 may encrypt the textual response data using a corresponding encryption cryptographic key, such as a public cryptographic key associated with client device 102 or the executed voice assistant application (e.g., in step 770), and may perform any of the exemplary processes described herein to package, within a portion of the encrypted textual response data, a network address of client device 102, such as an IP address (e.g., in step 772). In some instances, third-party system 180 may transmit the encrypted textual response data across network 120 to provider system 130, which may perform any of the exemplary processes described herein to route the encrypted textual response data to client device 102 (e.g., in step 774). In some instances, the encrypted textual response data may correspond to synchronous response to the third-party query data that passes through the computing systems associated with the cloud-services provider, including provider system 130, which reduces the likelihood that entities unrelated to user 101 or the financial system that operates third-party system 180, such as the provider of the cloud-based services, may access, locally maintain, or distributed the elements of sensitive profile, account, or transaction data included within the encrypted acoustic data. Exemplary process 750 is then complete in step 776.

Referring back to FIG. 7A, client device 102 may receive, from provider system 130, the encrypted textual response data generated by third-party system 180 through a corresponding programmatic interface (e.g., in step 712). Client device 102 may perform any of the exemplary processes described herein to access a corresponding cryptographic decryption key (e.g., a private cryptographic key associated with client device 102 or the executed voice assistant application) and to decrypt the encrypted textual response data using the cryptographic decryption key (e.g., in step 714).

Client device 102 may also perform operations that apply any one or more of the exemplary TTS processes or speech-synthesis processes described herein to the now-decrypted textual response data, and based on the application of the one or more of the exemplary TTS processes or speech-synthesis processes, client device 102 may generate audio content representative of the textual response data, which include, but is not limited to, the one or more requested elements of sensitive profile, account, or transaction data (e.g., in step 716). In some instances, an acoustic interface of client device 102, such as a speaker, may present the generated audio content as a verbal response to the captured utterance (e.g., in step 718). Exemplary process 700 is then complete in step 720.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, voice assistant application 104, voice assistant engine 132, APIs 134, 182, 210, and 318, verification module 136, spectrum processing module 138, adaptive NLP engine 142, query generation module 148, query verification module 184, data retrieval module 186, response generation engine 192, element population module 196, speech synthesis module 202, encryption module 206, secure playback module 212, ultrasonic encoding module 302, message composition module 306, encryption module 206, routing module 314, decryption module 319, playback initiation module 320, speech synthesis module 322, mobile banking application 330, ultrasonic decoding module 332, local spectrum processing engine 418, local encryption engine 422, command generation engine 428, decryption module 444, homomorphic NLP engine 448, encryption module 468, routing module 471, and speech synthesis module 474, can be implemented as one or more computer programs, i.e., one or more modules of computer program instructions encoded on a tangible non-transitory program carrier for execution by, or to control the operation of, a data processing apparatus (or a computer system or a computing device).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, a TFT display, or an OLED display, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. The section headings used herein are for organizational purposes only, and are not to be construed as limiting the described subject matter.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
  a communications interface;
  a memory storing instructions; and
  at least one processor coupled to the communications interface and the memory, the at least one processor being configured to execute the instructions to:
    receive, via the communications interface, encrypted command data from a computing system;

decrypt the encrypted command data using a homomorphic private key, and perform operations that associate the decrypted command data with a request for an element of data;

obtain the requested data element, and using a public cryptographic key associated with a device, generate an encrypted response that includes the requested data element; and transmit the encrypted response to the device via the communications interface, the device being configured to decrypt the encrypted response using a private cryptographic key and to perform operations that present first audio content representative of the requested data element through an acoustic interface.

2. The apparatus of claim 1, wherein the at least one processor is configured to execute the instructions to load the homomorphic private key from a secure portion of the memory.

3. The apparatus of claim 1, wherein the computing system is further configured to:

receive encrypted coefficient data from the device, the encrypted coefficient data being representative of a power spectrum of second audio content obtained at the device, and the encrypted coefficient data being generated using a homomorphic public key associated with the device; and perform operations on the encrypted coefficient data that generate the encrypted command data.

4. The apparatus of claim 3, wherein the computing system is further configured to generate the encrypted command data based on an application of at least one of a machine learning process or an artificial intelligence process to the encrypted coefficient data.

5. The apparatus of claim 3, wherein:

the encrypted coefficient data comprises mel-frequency cepstral coefficients that establish a mel-frequency cepstrum representation of second first audio content; and the device is configured to generate the encrypted coefficient data using a homomorphic public key.

6. The apparatus of claim 1, wherein the at least one processor is further configured to execute the instructions to:

apply at least one of a machine learning process or an artificial intelligence process to the decrypted command data; and based on the application of the at least one of the machine learning process or artificial intelligence process, establish the association between the decrypted command data and the request for the data element.

7. The apparatus of claim 6, wherein the at least one processor is further configured to execute the instructions to:

determine an identifier of the requested data element based on the established association; and load the requested data element from the memory using the determined identifier.

8. The apparatus of claim 1, wherein the at least one processor is further configured to execute the instructions to:

perform operations that generate at least one of the homomorphic private key or a homomorphic public key associated with the device; and transmit the homomorphic public key to the device via the communications interface, the device being configured to store the homomorphic public key within a secure portion of a local memory.

9. A computer-implemented method, comprising:

receiving, using at least one processor, encrypted command data from a computing system;

using the at least one processor, decrypting the encrypted command data using a homomorphic private key associated with a device, and performing operations that associate the decrypted command data with a request for an element of data;

using the at least one processor, obtaining the requested data element, and generating an encrypted response that includes the requested data element using a public cryptographic key associated with the device; and transmitting the encrypted response to the device using the at least one processor, the device being configured to decrypt the encrypted response using a private cryptographic key and to perform operations that present audio content representative of the requested data element through an acoustic interface.

10. A device, comprising:

a communications interface;

a memory storing instructions; and at least one processor coupled to the communications interface and the memory, the at least one processor being configured to execute the instructions to:

using a homomorphic public key, generate encrypted coefficient data representative of a power spectrum of first audio content, the first audio content identifying a request for an element of data maintained at a first computing system;

transmit the encrypted coefficient data to a second computing system via the communications interface, the second computing system being configured to generate encrypted command data based on the encrypted coefficient data and transmit the encrypted command data to the first computing system;

receive, via the communications interface, an encrypted response from the first computing system that includes the requested data element;

decrypt the encrypted response using a private cryptographic key; and based on the decrypted response, perform operations that present second audio content representative of the requested data element through an acoustic interface.

11. The device of claim 10, wherein the at least one processor is further configured to execute the instructions to:

determine a plurality of coefficients that establish the representation of the power spectrum; and encrypt the plurality of coefficients using the homomorphic public key, the encrypted coefficient data comprising the plurality of encrypted coefficients.

12. The device of claim 11, wherein:

the representation of the power spectrum comprises a mel-frequency cepstrum representation of the audio content; and the coefficients comprise mel-frequency cepstral coefficients that establish the mel-frequency cepstrum representation.

13. The device of claim 10, wherein the at least one processor is further configured to execute the instructions to load the homomorphic public key from a secure portion of the memory.

14. The device of claim 13, wherein the at least one processor is further configured to execute the instructions to:

receive the homomorphic public key from the first computing system via the communications interface; and perform operations that store the homomorphic public key within the secure portion of the memory.

15. The device of claim 10, wherein the second computing system is further configured to generate the encrypted command data based on an application of at least one of a machine learning process or an artificial intelligence process to the encrypted coefficient data.

16. The device of claim 10, wherein the first computing system is further configured to:
- receive the encrypted command data from the second computing system, and decrypt the encrypted command data using a private homomorphic key associated with the device;
- based on an application of at least one of a machine learning process or an artificial intelligence process to the decrypted command data, establish the association between the decrypted command data and the requested data element;
- obtain the requested data element from a data repository; and
- using a public cryptographic key associated with the device, generate the encrypted response that includes the requested data element, and transmit the encrypted response to the device.

17. The device of claim 10, wherein:
- the second audio content comprises synthesized speech representative of the requested data element; and
- the at least one processor is further configured to execute the instructions to:
  - generate the synthesized speech based on an application of at least one of a machine learning process or an artificial intelligence process to the requested data element; and
  - perform operations that present the synthesized speech through the acoustic interface.

18. The device of claim 10, further comprising the acoustic interface, the at least one processor being coupled to the acoustic interface, and the at least one processor being further configured to execute the instructions to present the second audio content through the acoustic interface.

19. The device of claim 18, further comprising an acoustic input device, wherein:
- the at least one processor is coupled to the acoustic input device;
- the at least one processor is further configured to execute the instructions to receive the first audio content from the acoustic input device; and
- the first audio content is representative of an utterance of a user of the device.

20. The device of claim 10, wherein the at least one processor is further configured to execute the instructions to transmit, via the communications interface, the second audio content to an additional device that includes the acoustic interface, and the additional device being configured to present the second audio content through the acoustic interface.

* * * * *